(12) United States Patent
Parhar et al.

(10) Patent No.: US 10,878,170 B2
(45) Date of Patent: Dec. 29, 2020

(54) SYSTEM AND METHOD FOR DELIVERING SEAMLESS CONTINUOUS PLAY OF PERSONALIZED AND CUSTOMIZED MEDIA AND BROWSER SCREEN SHARING

(71) Applicant: Musyfy Inc., Mississauga (CA)

(72) Inventors: Sarbjit S. Parhar, Mississauga (CA); Aye Kyawt Myaing, Richmond Hill (CA); Afreen Munawwar, Glenmore Park (AU)

( * ) Notice: Subject to any disclaimer, the term of this patent is extended or adjusted under 35 U.S.C. 154(b) by 88 days.

(21) Appl. No.: 16/140,956

(22) Filed: Sep. 25, 2018

(65) Prior Publication Data

US 2019/0095403 A1 Mar. 28, 2019

Related U.S. Application Data

(60) Provisional application No. 62/563,012, filed on Sep. 25, 2017.

(51) Int. Cl.
*G06F 17/20* (2006.01)
*G06F 40/106* (2020.01)
(Continued)

(52) U.S. Cl.
CPC .......... *G06F 40/106* (2020.01); *G06F 3/1454* (2013.01); *G06F 16/9558* (2019.01); *G06F 16/986* (2019.01); *G06F 40/14* (2020.01); *H04L 67/02* (2013.01); *H04L 67/20* (2013.01); *H04L 67/38* (2013.01); *G09G 2354/00* (2013.01);
(Continued)

(58) Field of Classification Search
CPC .... G06F 3/1454; G06F 3/1462; G06F 40/106; G06F 16/986; G06F 16/9558; G06F 2216/15; G06F 16/954; H04L 67/38; H04L 67/02; H04L 67/20; G09G 2370/027; G09G 2354/00; G09G 2370/022
See application file for complete search history.

(56) References Cited

U.S. PATENT DOCUMENTS

| | | | | |
|---|---|---|---|---|
| 8,375,304 B2 * | 2/2013 | Swenson | ............... | G06F 16/957 715/738 |
| 2011/0126130 A1 * | 5/2011 | Lieb | ...................... | G06F 3/1454 715/753 |
| 2015/0116391 A1 * | 4/2015 | Murugesan | ............... | G09G 3/20 345/698 |

OTHER PUBLICATIONS

Lowco, How to set up browser Source for Streaming, "http://streamersquare.com/how-to-set-up-browser-source-for-streaming/", Mar. 11, 2016.

* cited by examiner

*Primary Examiner* — Keith D Bloomquist
(74) *Attorney, Agent, or Firm* — Ridout & Maybee LLP

(57) ABSTRACT

System and method for delivering seamless continuous play of personalized or customized media and browser screen sharing for social shopping. The system is for seamlessly and continuously playing a media file over various web browser windows from different web domains. For browser screen sharing between a first device and a second device, the system includes a front end within a first web browser application of the first device that is displaying the third-party webpage on a first web browser window. The system includes a backend configured to send code to the second device to display the same third-party webpage with the same relative webpage view settings on a second web browser window of the second device as the first web browser window. Any changes to the current webpage or any of the webpage view settings first web browser window of (Continued)

the first device are reflected in the second web browser window of the second device.

26 Claims, 18 Drawing Sheets

(51) Int. Cl.
*H04L 29/08* (2006.01)
*G06F 3/14* (2006.01)
*G06F 16/958* (2019.01)
*G06F 16/955* (2019.01)
*H04L 29/06* (2006.01)
*G06F 40/14* (2020.01)

(52) U.S. Cl.
CPC . *G09G 2370/022* (2013.01); *G09G 2370/027* (2013.01)

SYSTEM AND METHOD FOR DELIVERING SEAMLESS CONTINUOUS PLAY OF PERSONALIZED AND CUSTOMIZED MEDIA AND BROWSER SCREEN SHARING

RELATED APPLICATION

This application claims priority from U.S. Provisional Patent Application No. 62/563,012, filed Sep. 25, 2017, entitled SYSTEM AND METHOD FOR DELIVERING SEAMLESS CONTINUOUS PLAY OF PERSONALIZED AND CUSTOMIZED MEDIA, the contents of which are incorporated by reference into the DETAILED DESCRIPTION OF EXAMPLE EMBODIMENTS herein below.

TECHNICAL FIELD

Some example embodiments relate to media distribution, and in particular, to systems and methods for delivering seamless continuous play of personalized and customized media. Some example embodiments relate to browser screen sharing.

BACKGROUND

In conventional systems, media players can be embedded in websites. However, it may be difficult to have a continuous and seamless customer experience, such as information seeking, shopping and gaming. For example, if a media player is embedded in a web browser window of a webpage, when the webpage is refreshed or reloaded, the media player embedded therein is also refreshed and the media will play from the beginning of the media. When a new web browser window is opened from the same or another webpage, media will be played by the different web browser windows at the same time. This causes interruptions and an unpleasant audio experience. When there are more than one web browser windows, all of the media players may be playing simultaneously, resulting in confusion and multiple sounds playing at the same time.

As well, often the same media contents are always played for the particular webpage irrespective of the particular online end customer. In many conventional systems, media contents used in various webpages are predetermined and are the same for all customers.

As well, the online shopping experience can be a solitary exercise. The end customer experience is usually bland and conversion rate for online purchases is low, at around 3%. People generally would like to consult others prior to making a purchase decision, but this option is not available. Further, as the baby boomers are getting old their vision is getting impaired. Additionally there is a segment of population who are physically impaired and may have difficulty manipulating their user input device, such as a keyboard, mouse, touch screen. Therefore, people, especially with visual and physical challenges, may need help in online shopping.

As well, some conventional web screen sharing systems are inefficient. For example, some conventional web screen sharing systems continuously screen capture an image of the entire screen of one user, which can lead to high data loads for that user, and rely on image or video compression or other techniques to compensate.

Additional difficulties with existing systems may be appreciated in view of the Detailed Description of Example Embodiments, herein below.

SUMMARY OF THE INVENTION

In accordance with an example embodiment, there is provided a system for playing a media file, comprising: a backend configured for registering at least one website domain; a front end embedded in each of at least one web browser window of a device, each web browser window associated with at least one of the website domains registered with the backend, each front end including a media player, the backend configured to generate a unique device identification (ID) for uniquely identifying the device, wherein the backend is configured to direct the media player of only one web browser window of the at least one web browser window to play the media file.

In accordance with an example embodiment, there is provided a system for uniquely identifying a device, comprising: a backend; a front end embedded in a web browser window of the device, the backend configured to generate a unique device identification (ID) for uniquely identifying the device, the device ID generated by the backend from a combination of image of browser settings of the web browser of the device, User Agent data of the device, and an IP address of the device, the backend configured to receive a communication from the front end, verify the device ID from the communication and send, when there is successful verification of the device ID, a second communication to the device through the front end.

In accordance with an example embodiment, there is provided a system for web screen sharing between a first device and a second device, the system comprising: a backend configured for: receiving, from a front end within a first web browser application of the first device that is displaying a third-party webpage in a first web browser window, screen width and height of the first device, wherein the third-party webpage is from a third-party host server; receiving, from the front end, an address of the third-party webpage; receiving, from the front end, first webpage view settings of the first web browser window that is displaying the third-party webpage, the first webpage view settings comprising width and height of the first web browser window that is displaying the third-party webpage, and first scroll X and Y positions of the first web browser window that is displaying the third-party webpage; receiving, from the third party host server, the web page width and height of the third party webpage; generating a link that addresses the backend; sending the link to the second device; and in response to detecting selection of the link by the second device: receiving, from the second device, second screen width and height of the second device, and width and height of the second web browser window, and transmitting, to the second device, code for displaying of the third-party webpage on a second web browser window of the second device, and second webpage view settings, comprising second scroll X and Y positions of the second web browser window, for displaying of the third-party webpage on the second web browser window of the second device to effect a same relative webpage view setting as the first webpage view settings of the first web browser window that is displaying the third-party webpage on the first device.

Another example embodiment is a method of online shopping, including: selecting, by a first device, a designated webpage; sending an invitation to a second device for visiting the designated webpage, the invitation including a link to share a web screen of the first device including the designated webpage and the X & Y Coordinates of the webpage to display based on the screen resolution, web page information and browser information; generating for display, on a web screen of the second device, contents of the designated webpage; providing two-way audio between the two devices when the web screen is shared; and playing media simultaneously on the two devices when the web screen is shared, the media being selected based on an end customer of at least one or both of the two devices.

BRIEF DESCRIPTION OF THE DRAWINGS

Reference will now be made, by way of example, to the accompanying drawings which show example embodiments of the present application, and in which:

FIG. 12(*b*) is a diagram of a web screen sharing system, according to an embodiment, wherein scroll position, web browser window size and position are matched between the receiving device and the sending device;

DETAILED DESCRIPTION OF EXAMPLE EMBODIMENTS

In order for the webpages to provide an improved online customer experience, different end customers should have different media choices. As well, remote users should be able to share the browsing and online shopping experience.

In this application, the term web browser window of a webpage can also refer to web windows, headless web windows, or web browser tabs within a web browser program. In all examples herein, any reference to operation by a "person", "user" or "customer" similarly applies to a function or operation of a "device" being used by that person, user or customer.

Figure 1:
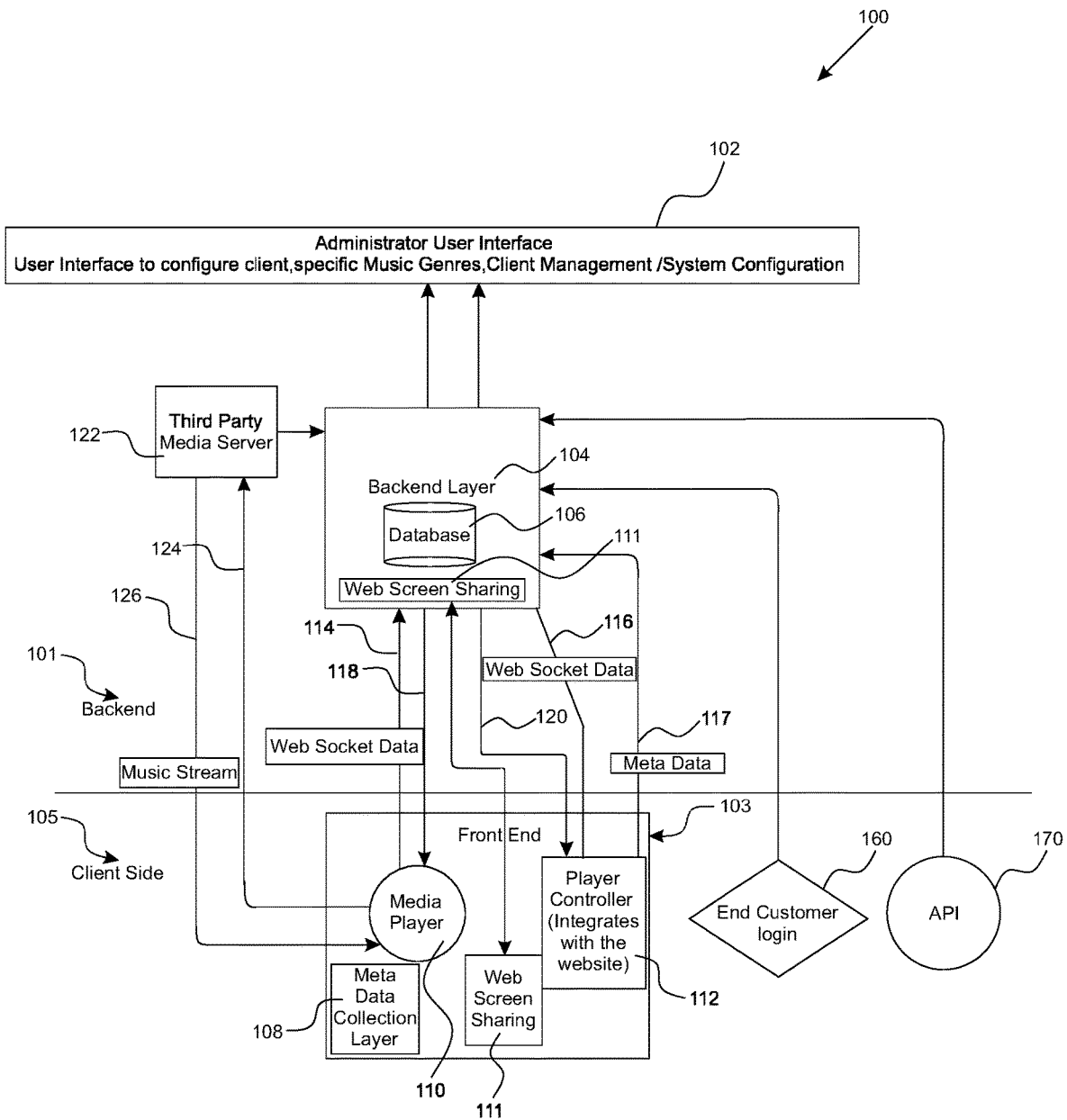
FIG. 1 is a block diagram, illustrating an exemplary system according to an example embodiment.

FIG. 1 is a block diagram illustrating a system 100 according to an example embodiment. The system 100 is configured for delivering seamless continuous play of personalized and customized media on a device. The system 100 is also configured for screen sharing and social shopping between two devices. System 100 may include a backend 101 and a client side 105, wherein the client 105 includes a front end 103. The front end 103 and the backend 101 are configured to communicate with each other. The backend 101 includes an Administrator User Interface (AUI) 102, and a Backend Layer (BL) 104. The BL 104 can be invisible to an online end customer, in that the end customer is merely browsing to a third party web domain that is registered with the BL 104. The BL 104 can comprise one or more processors. In other examples, the online end customer can specifically log into the BL 104. In some examples, the backend 101 includes a Media Server 122 (MS). In some examples, the MS 122 is a third party media server to the BL 104. In other examples, the MS 122 is a first party media server to the BL 104. The MS 122 can be a plurality of media servers. In some examples, MS 122 may be a virtual server in the cloud.

The MS 122 stores media files or has access to a library of media files. AUI 102 is an interface that allows a system administrator of BL 104, or a person with suitable access rights, to configure client/end user specific music genres, client management, and system configuration. BL 104 includes a database 106. The database 106 includes one or more memories, and include one or more processors. The database 106 can store User ID information (including user information, user history, user demographics, user preferences, etc.), Device ID information, and media file information about the media files. Typically, the database 106 does not store the media files themselves as those are stored in the MS 122.

The client side 105 includes a user device having the user interface visible to the online end customer, and includes the front end 103. Other end nodes can be on the client side 105. In some examples, the front end 103 is a module that is integrated or embedded in one or more browser windows from webpages of one or more same or different web domains. The webpages are from third party web domains that have been registered by third party clients (such as online businesses) with the system 100 at the backend 101. The front end 103 is embedded in the one or more web pages of one or more web domains of devices used by end customers. In some examples, the web browser windows include and are used to display the web pages. If an end customer opens more than one web browser window, the front end 103 can be embedded in each of the web browser windows.

The front end 103 includes a Meta Data Collection Layer (MDCL) 108, a Media Player (MP) 110, and a Player Controller (PC) 112. In some example, system 100 may include a web screen sharing application 111 (also referred to as screen sharing application 111) for providing screen sharing services and web screen sharing services. Screen sharing application 111 is configured to communicate with BL 104. Screen sharing application 111 may be embedded in one or more browser windows from webpages of one or more same or different web domains. Screen sharing application 111 is described in greater detail herein. In some examples, MP 110 is a media player and can display a logo and an equalizer graphic (static or dynamic) to illustrate that the MP 110 is launched. In some examples, media selection of the MP 110 is controlled by the end customer directly; for examples, the end customer can select the media from the front end 103. In some examples, media selection of the MP 110 is not controlled by the end customer directly, but is controlled through the backend 101. The PC 112 integrates into the webpage and has user controls for the MP 110.

When an online customer browses a webpage embedded with the front end 103 and chooses to play the media through the PC 112, BL 104 receives information 117, for example in the form of meta data, from PC 112 and sends a communication 118 to MP 110 and a communication 120 to the PC 112. The communications 118 and 120 include the specific media previously played by MP 110, such as a web link or media file identifier (media file ID) of the specific media in the Media Server (MS) 122, and the previous point stopped that was played in the front end 103 of the last web browser window for that device of the end customer. MP 110 sends a request 124 of playing the specific media at the stop point to the MS 122, and the MS 122 in response transmits media stream 126 starting from the stop point to the MP 110. In examples, media can include video, audio, and video and audio. MP 110 may then resume playing the specific media from the previous stop point. When the media stream 126 has been received from the MS 122, the MP 110 plays the media at the previous stop point. Once MP 110 has played the media, the information of the progress of playing the media is sent from MS 122 to the BL 104 for recording in the database 106.

In some examples, the MP 110 obtains the entire media file and identifies the start point based on the previous stop point information from the BL 104. In some examples, the MS 122 can feed the media to the MP 110 from the previous stop point. In other examples, MP 110 may only send a request 124 to the MS 122 of playing the specific media file ID without specifying the previous stop point, and the MP 110 obtains the entire media file having the media file ID from the MS 122, and the MP 110 starts the media file at the previous stop point.

When the media is playing on the current webpage or after the media has been played, MP 110 collects and transmits Web Socket Data 114 related to the webpage to BL 104. The PC 112 also collects and transmits Web Socket Data 116 related to the webpage to BL 104. The Web Socket Data 114 and 116 may include product information being displayed, location of the customer, time of the day information, customer taste or profile, such as mood and channel, and other information. Web Socket Data 114 and 116 is processed by BL 104 and the processed web socket data is stored in the database 106. Additionally, PC 112 also collects and transmits meta data 117 to BL 104. BL 104 processes the meta data 117 and the processed meta data is stored in the database 106.

By way of illustration, the end customer opens a first web browser window which has a first front end 103 integrated therein. The BL 104 send a media file ID to the first front end 103 of the web browser window. When the end customer plays the PC 112, the first front end 103 sends a request to the MS 122 with the media file ID, and in response the MS 122 sends or streams the media that was identified in the media file ID to the media player 110, which plays the media on the media player 110 of the end customer. When a second web browser window is selected or activated, a second front end 103 is integrated therein, the media at the first front end 103 stops playing at a stop point, and this information is communicated to the BL 104 using the Web Socket Data 114. The BL 104 sends the media file ID and the stop point to the second front end 103 using communication 118 to MP 110 and communication 120 to the PC 112. The second front end 103 requests the media from the MS 122 using the media file ID, and the MS 122 send or streams the media to the second front end 103 at the same stop point as from the first front end 103, wherein the front end 103 plays the media from the same stop point, therefore providing seamless and continuous media playing on the device of the end customer.

In some examples, the system 100 includes a generic library (GL) at the front end 103. The GL uses application programming interface (API) calls to collect, store/record, and send information associated with the end customer to the backend 101. The information captured by API calls includes, for example, number of web pages browsed by the end customer and online shopping cart status associated with the end customer, geographical location of the end customer, time of the day, unique device information associates with a specific end customer, visit information of the end customer such as Website URL, time spent on the website, web site or web page browsed, MP 110 status and media, such as songs, played, skipped or rated.

In some examples, the end customer may log into system 100 from the front end 103 using social media account. The social media account is registered with the system 100 in association with the unique end User ID that the system 100 uses to uniquely identify the end customer. The log in information may be stored in database 106. In an example, the end customer can log in, using end customer login 160, directly to the BL 104, such as with its registered Facebook™ account, authenticated through Facebook™, wherein the account is associated with a User ID stored in the database 106. In another example, the end customer may also log into system 100 using a first party web domain (first party to the BL 104) with their User ID that is registered with system 100. Applicant Protocol Interface calls (API) 170 can be used to record or facilitate these registration processes, for example, by recording a customer-registered User ID. In another example, API calls 170 may be used to access the number of webpages browsed by an end customer or the shopping cart status of the end customer. A similar login process can be performed by owners of the web domains.

In some examples, similar to a media player, the front end 103 of system 100 may play, stop, pause, forward and rate the media file (e.g. music file). The music file typically contains a song that can be classified within one or more music genres, or is played by one or more radio stations, podcasts, streaming service, etc. Example music file formats include MP3, Advanced Audio Coding (AAC), High Efficiency AAC (HE-AAC), Vorbis, and Opus. The music file can be controlled by Player Controller 112, which allows user control of the MP 110. In this case, PC 112 controls play, stop, pause, forward and rate the media file in the MP 110.

Figure 2:
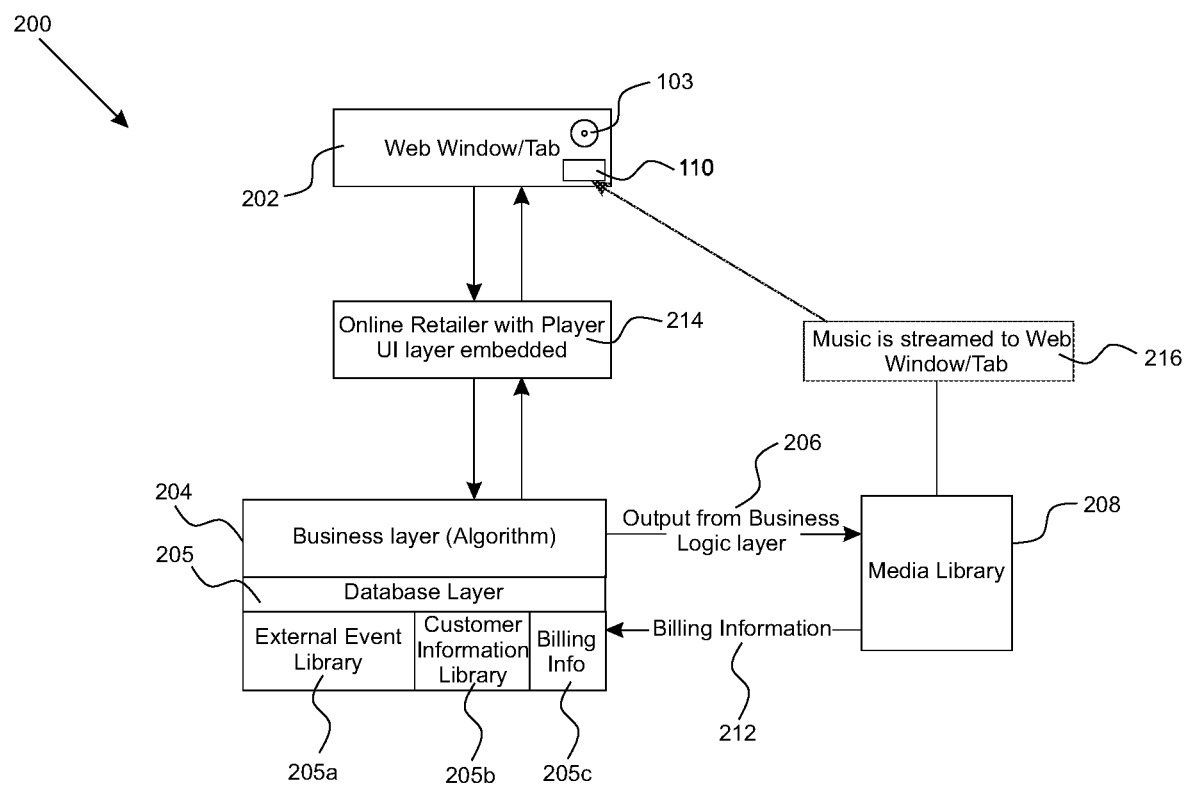
FIG. 2 is an exemplary block diagram showing an example of playing media seamlessly and continuously by the system of FIG. 1.

FIG. 2 is an exemplary block diagram 200 showing an example of playing media seamlessly and continuously by system 100. In diagram 200, when two or more web browser windows have been opened, each web browser window can have a front end 103 integrated in that web browser window. The web browser window 202 is one of the web browsers accessing the website of an online retailer 214 (third-party host server). The front end 103 is on the client side 105 that includes an MP 110 and PC 112. In some examples, the MP 110 is embedded in the web page of web browser window 202, and the PC 112 in web browser window 202 has control over the MP 110 in the web browser window 202. In some examples, the web browser windows can include at least two web browser windows 202 each having the MP 110 from webpages of the same website domain or different website domains. The website domains can be registered with the BL 104. The PC 112 of each web browser window may include a player button. When a customer clicks the player button to play media, the command to play a specific media associated with the click action is sent to the BL 104 of the system 100. Referring to FIG. 2, BL 104 in FIG. 1 is a business layer 204 and database 106 in FIG. 1 is a Database Layer (DL) 205. The business layer 204 had sent code to the third-party host server (online retailer 214) for the online retailer 214 to embed the front end 103 into the webpages that are accessed by one or more web browser windows 202 accessing the website of an online retailer 214. When the one or more web browser windows 202 access the online retailer 214, the front end 103 is embedded within the webpage from the online retailer 214. DL 205 may include an external event library (EEL) 205*a* for storing information of active web browser window associated with the end customer, a customer information library 205*b* for storing information related to end customers, and a billing information library 205*c* for storing billing information received from MS 122, such as billing information related to the media played by the users who had accessed the website of the third party web domain owner. In some examples, EEL 205*a* may store information such as music genre list and popularity, current events including political, economic, social, technological and environmental events, cultural events including festivals, holidays, and special events, and environmental data including weather, time of day and day of week. In some examples, the customer information library 205*b* may store information of end customers, such as identity of present online customer, customer background, customer age, customer gender, customer music or other listening taste, customer history, customer frequency of visits to the present online site, both near term and long term, customer time spent on the present online site, both near term and long term, identity of present online site, nature of product or service of interest to the participant as evidenced by the customer's current online activity, history of sound experience delivered to the online site by entity associated with the online site, customer geographical location. The customer information library 205*b* may store social media account postings by the user, such as Facebook™ status (e.g., happy or sad), tweets through Twitter™, etc. The business layer 204 can be configured to use at least one of the external event library (EEL) 205*a* and the customer information library 205*b* to intelligently select a media file for playing on the MP 110.

In the example of FIG. 2 business layer 204 determines which web browser window is the active web browser window, in which the MP 110 embedded in that active web browser window is to receive and play the media stream. In some examples, where more than one web browser window are opened, business layer 204 selects the web browser window that is most recently selected by the user as the active window. In some examples, the most recently opened window is designated as the active window. The web browser window 202 may implement a media buffer for buffering the media file 216 received or streamed from media library (ML) 208. In some examples, the last-selected web browser window is the active window, and such active window status is unaffected by the user selecting other applications or windows (e.g., a word processing application or an e-mail application). In some examples, the web browser window on top of other web browser windows is the active web browser window, or the web browser window currently displayed on the screen of the user device (e.g. a computer, a tablet, a mobile phone) is the active web browser window.

Business layer 204 receives information 114 and 116 from front end 103 of each web browser window, which includes the browser ID of each web browser window, the specific media played by each web browser window, and previous stop points. Accordingly, business layer 204 knows which browser ID is the active web browser window, for example, the web browser window having the latest stop point or playing the media is the active web browser window. In case that only one web browser window associated with the end customers 314 and 316 (FIG. 3) is open, the active web browser window is the one web browser window. After the active web browser window has been decided, business layer 204 transmits relevant information to the MS 122, for example media library (ML) 208 in FIG. 2, so that the specific media can be played on the active web browser window. In some examples, the relevant information includes the link of specific media to be played and identification information of the active web browser window. In some examples, business layer 204 also transmits information of the previous stop point of the specific media to MS 122 so that the specific media can be seamlessly and continuously played on the next active web browser window from the last stop point.

In response to receiving the information of the specific media and/or the previous stop points from the business layer 204, ML 208 transmits the specific media to the MP 110 embedded in the active web browser window for playing. The active web browser window in the example of FIG. 2 is window 202. MP 110 may contain a buffer to temporarily store media stream received from ML 208. The buffer also allows the specific media to be played on the MP 110 from the previous stop point, if the media stream is not provided by the ML 208 from the previous stop point. Window 202 in the example of FIG. 2 does not include any control buttons for controlling the playing of the specific media. In other examples, control buttons can be provided in window 202.

By playing the media stream only on the active web browser window at the previous stop point, the selected media is played seamlessly and continuously for a specific end customer associate with a device, even if the end customer switches between the registered websites, closes one of the non-active web browser windows. As well, this avoids the problem of having multiple media being played on multiple web browser windows.

In some examples, ML 208 transmits billing information of providing the media stream services to window 202 to the business layer 204. Business layer 204 may then associate the billing information with the specific customer, e.g. a third-party web domain owner such as an online retailer or an online company.

Figure 3:
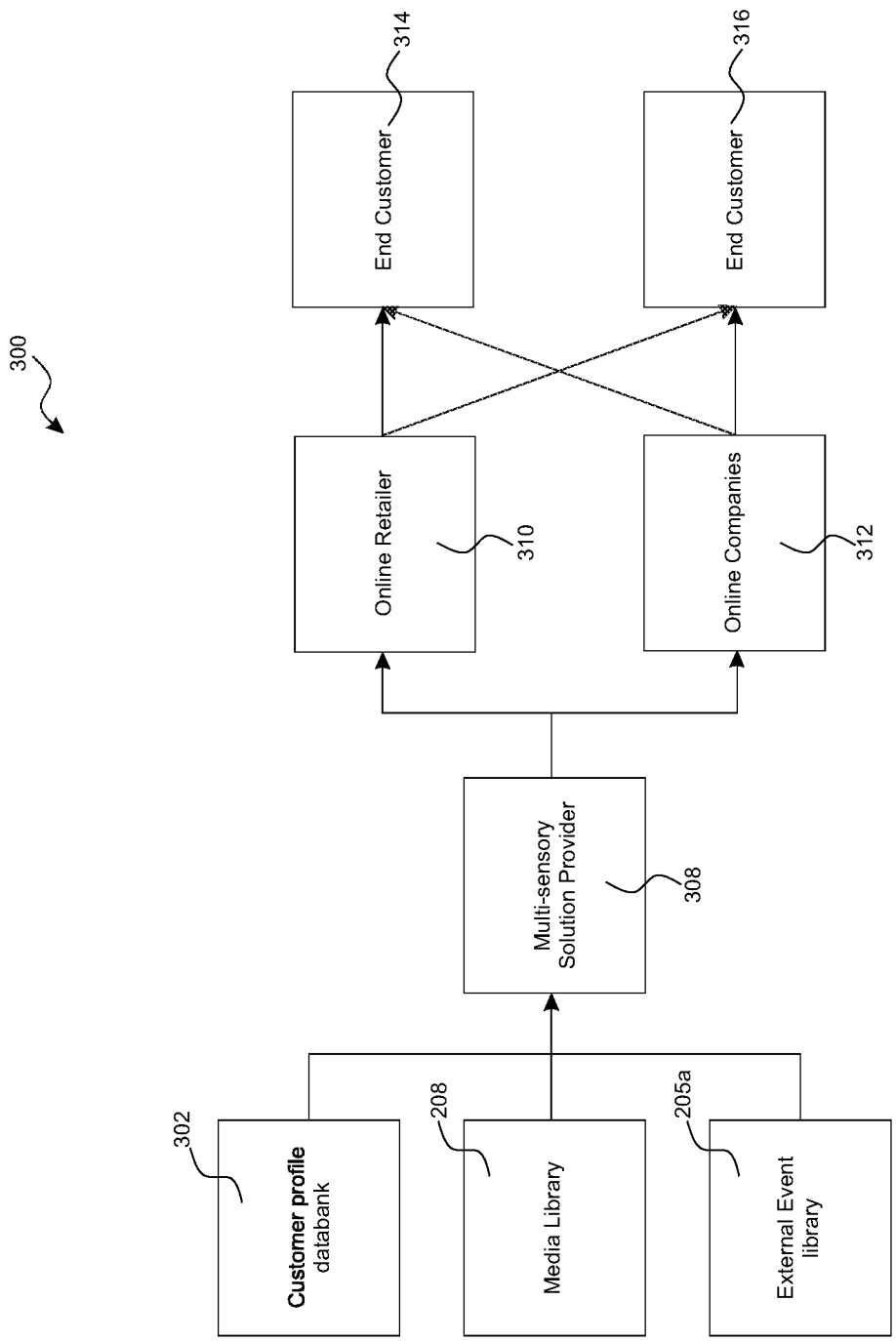
FIG. 3 is a block diagram showing an example of identifying a specific end consumer.

FIG. 3 is a block diagram 300 showing an example that media, such as music, may be seamlessly and continuously played for a specific end customer by compiling information related to the end customer. In FIG. 3, a Multi-sensory Solution Provider (MSSP) 308, such as backend 101 of system 100, compiles information related to end customers 314 and 316, from sources such as a customer profile databank (CPD) 302 which is an example of customer information library 205b in FIG. 2, a media library 208 such as a music library, and an EEL 205a. Based on the information stored in ML 208 and the CPD 302, MSSP 308 identifies and selects specific media played for each of the end customers 314 and 316, and the previous stop points of the specific media played for the end customers 314 and 316. The BL 104 had previously sent code to third-party host servers (online retailer 310 or online companies 312) for those third-party host servers to embed the front end 103 into the webpages that are accessed by one or more end customers 314, 316. When the one or more web browser windows 202 access the online retailer 310 or online companies 312, the front end 103 is embedded within the webpage from the online retailer 310 or online companies 312. Once the end customers 314 and 316 are identified, in some examples, the MSSP 308 generates a playlist based on the product the end customer 314 or 316 is looking at on the Online Retailer 310 website (third-party host server); the CPD 302 provides the historical customer taste information; EEL 205a provides the external event information; and ML 208 provides the available media. Based on the information stored in the EEL 205a and the CPD 302, MSSP 308 identified the active web browser window of the device associated with the end customers 314 and 316. BL 104 uniquely identifies a device of the specific end customer 314 or 316 by identifying a Device ID based on, for example, image of browser settings and/or IP address of the device and/or User Agent data, which will be described in great detail below. The BL 104 can also identify the end customers though a User ID when the end customer logs into the BL through the front end 103 or directly to a first party website or first party application.

As such, MSSP 308 has the information of the active web browser window in which specific media should be played at the previous stop point for each of end customers 314 and 316. MS SP 308 may provide this information to online business, such as online retailer 310 and online companies 312 (third-party host servers). With this information, when the end customer 314 or 316 browses the online contents of the online business, the media plays only in the active web browser window from the previous stop point for the specific end customer 314 or 316. In other words, the media is played seamlessly and continuously for a specific end customer when the end customer browses the online contents of the online business, and this improves the end customer's shopping experience. In some examples, the online contents include current contents which include at least a product or service that can be purchased from a web domain, and the web domain is an electronic commerce web domain.

To distribute the personalized and/or customized media, BL 104 identifies a device and saves the identification of the device associated with a specific online end customer. The BL 104 generates the Device ID to uniquely identify the device. In some examples, IP address alone is insufficient since IP address resolution is only up to the household or office, but not to the specific device. IP address of a device is available to the system 100 when the device visits the third party web domains registered with system 100, because those third party websites have the front end 103 loaded therein, which is configured to communicate with the back-end 101. In one household, however, there may be more than one device with the same IP address, and IP address may be changed from time to time. The medium access control (MAC) address of a device is also impractical, as it is not publicly available due to the security concerns. Instead, in some examples, BL 104 identifies the image of the browser settings from each device. Each web browser such as Microsoft Internet Explorer™ or Google Chrome™ associated with or installed in a device has a unique image of browser settings. When a device first visits a website registered with system 100, BL 104 generates saves the image of browser settings of the devices in database 106 of system 100. In each subsequent visit of the registered websites with system 100 by the device, BL 104 compares the image of browser settings of the device with the saved image of browser settings in database 106. If BL 104 finds a match, BL 104 identifies the device with the image of browser settings, and thus identifies the associated end customer of the device. Accordingly, BL 104 may provide personalized and/or customized services to the end customer, without the end customer necessarily logging in or being specifically registered at the BL 104. The personalized and/or customized services may include context-based music services. For example, system 100 may play a music file selected based on the context or content of a webpage or a website window. In some examples, image of the browser settings lead to 94% accuracy in identifying the individual device.

In some examples, BL 104 may identify the device with a Device ID which includes the image of the browser settings and the IP address used by the device and the User Agent data of the device. This approach may results in an good accuracy, such as 99.95% accuracy, in identifying the device and thus the associated end customer of the device. The IP address of the device may be saved in database 106. In this case, BL 104 saves the image of the browser settings and the IP address used by the device when the device first visits a website registered with system 100. In subsequent visits of any one of the websites registered with system 100 by the device, BL 104 compares both the image of the browser settings and the IP address of used by the device with those saved in database 106, and if a device match is found, BL 104 identifies the device and associated end customer to provide personalized and/or customized services to the end customer. In other examples, the Device ID is generated using the image of the browser settings, the IP address and User Agent data of the device.

For example, a user might log into two separate devices using their User ID. The BL 104 can ensure there are no media playing conflicts by generating the Device ID, which is different for each of the two separate devices. In examples, the front 103 sends a request to the BL 104 along with the Device ID (and other information) of the device currently being used by the end customer, and the BL 104 responds with the proper Media ID and stop point of the media having that Media ID to the front end 103.

BL 104 may record customer profile and taste in database 106 over time, such as customer information, image of the browser settings, IP address of a device, User Agent data, and customer taste/profile, such as mood and channel.

In some examples, personalized and/or customized services include providing personalized and/or customized media based on factors related to the end customer, media, and events, etc. For example, the factors include product or service provided by online business, different products/services associated with different media or music; end customer background, such as age and taste (different people would like to listen to different music); end customer history such as how many times the end customer visited a specific webpage; changing music depending on the time spent during the previous visit and when was the last visit; music change or continuation based on the history of the various online business; geographical location of the end customer; external events; music genre list and popularity; current events such as changing political, economic, social, technological environment; cultural events, such as festivals, holidays, special events, etc.; external environment such as weather or time of day or day of the week to account for different music files to suit different time of the day. For example, when an end customer is browsing real estate on a website, the contents of the webpage, such as the pictures of the real estate property and or the texts on the web browser window may be used as factors for system 100 to select a media file to be played on the active web browser window. In some examples, the BL 104 may be configured to determine the contents of the webpages, for example from image or text recognition, and then select a suitable music file based on the context from the contents of the webpages.

By providing personalized and/or customized services to the end customer, system 100 improves end customer experience, increases the time end customer spending on the website on online business by playing media, such as music, harmonious with the products and thus eliciting products buying, increase the cart size, customer loyalty, and improves conversion rate.

Figure 4:
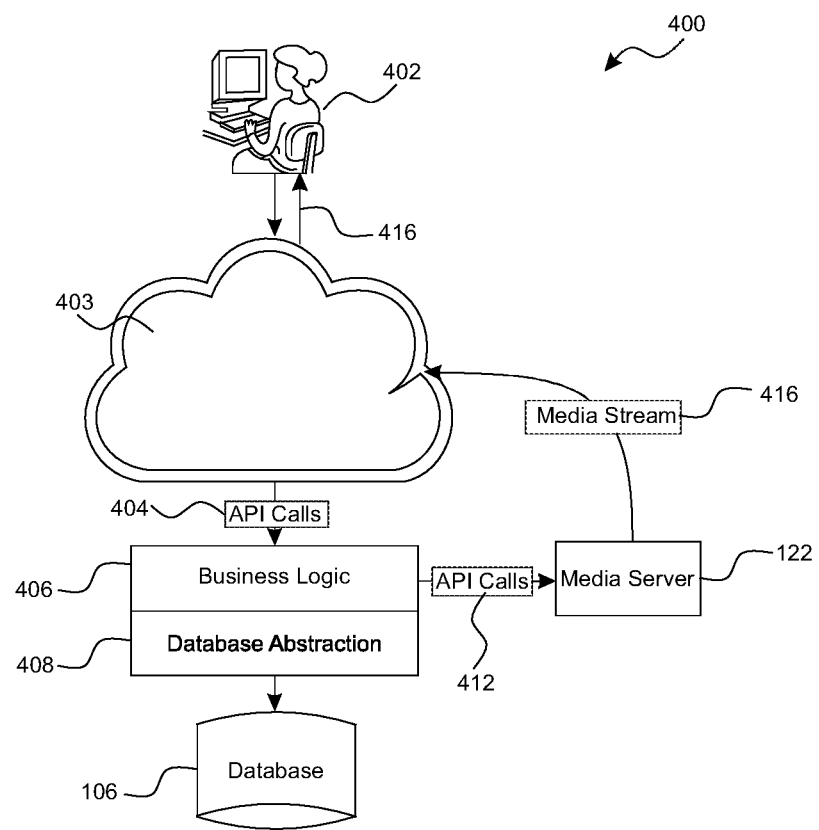
FIG. 4 is a block diagram showing an example of seamlessly playing media, for an end customer in a web browser window by the system of FIG. 1.

FIG. 4 is a block diagram 400 showing an example of using system 100 for seamlessly and continuously playing media (music), for an end customer in a web browser window. In the example of FIG. 4, an end customer 402 opened at least one web browser window, each embedded with the front end 103 of system 100. The front end 103, such as MP 110 or PC 112 makes API calls 404, via a communication network 403, such as the Internet, to query the backend 101 of system 100. The backend 101 in the example of FIG. 4 includes the business logic 406, database abstraction (DA) 408, and database 106. The business logic 406 and database abstraction 408 are an example of the BL 104. In FIG. 4, business logic 406 receives the API calls 404 from the front end 103 related to the end customer 402, and instructs the DA 408 to query database 106 to retrieve relevant information related to the end customer 402 from database 106, such as the active web browser window identification (ID) associated with the end customer 402, the end user preference in terms of media. Based on the retrieved information from database 106, business logic 406 determines the media to be played for end customer 402 in the active web browser window. If only one web browser window is opened by the end user, the web browser window is the active web browser window. If two or more web browser windows are opened, business logic 406 determines the active web browser window according to criteria described above, specific media played on the last active web browser window, and the latest stop point of the specific media on the last active web browser window. Each web browser window has a web window ID from the markup language code or some other identifier from the front end 103 that uniquely identifies a web browser window.

With the determined media to be played for the end customer 402, the business logic 406 sends commands to MS 122 via API calls 412. The API calls 412 include identification of the specific media. If two or more web browser windows of the same website or different websites are opened, the API calls 412 may also include the stop point of the specific media, and the web window ID. With the information contained in the API calls 412, MS 122 sends media stream 416 via the communication network 403 to the end customer 402 for playing on the front end 103, such as on the MP 110 of the active web browser window with the web window ID.

Figure 5:
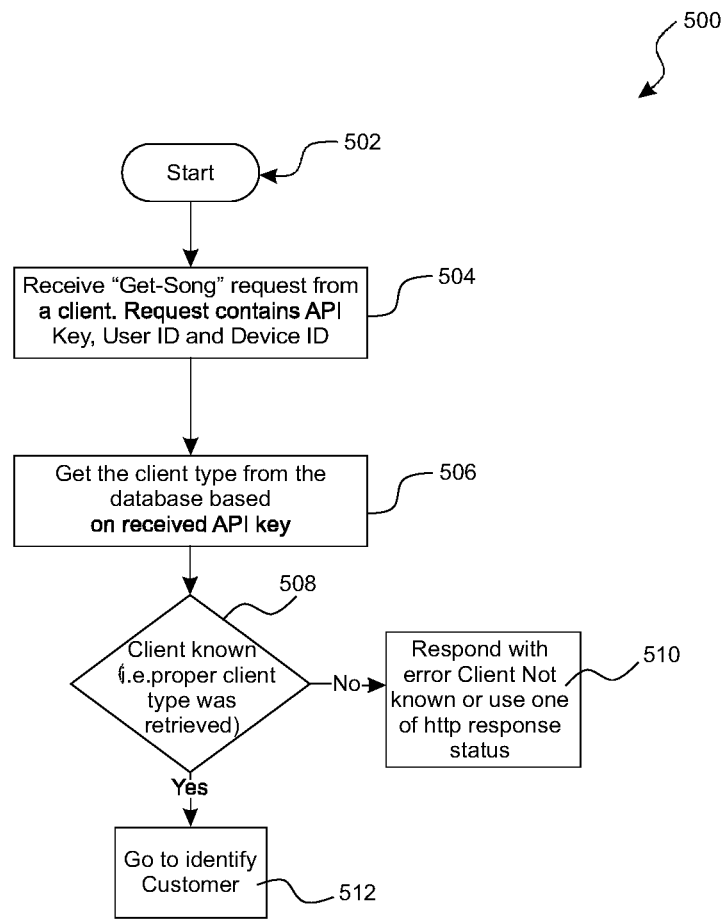
FIG. 5 is a flow chart showing a process of the business layer in the example of FIG. 4.

FIG. 5 is a flow chart 500 showing a process of the business logic 406 in the example of FIG. 4. After start 502, the business logic 406 receives API calls 404 from end customer 402 who is on a webpage (owned by client, who is a third party web domain owner) having the front end 103. The API calls 404 include a request, such as "Get-Song". The request may include an API key, a User ID (optional) and a Device ID (step 504). At 506, business logic 406 instructs DA 408 to determine and retrieve the client type of the third party web domain owner, such as travel, clothing, hardware, etc., from the database 106 based on the API key. For example, the client type is the type of online business of the third party web domain owner, such as online retailer or online companies.

Based on the response from database 106, business logic 406 determines whether the client is known, for example, based on whether the proper client type is retrieved from database 106 (step 508). If the client type cannot be retrieved from database 106 and therefore is not known to the business logic 406, the business logic 406 responds to the front end 103 with an error message, such as "Client is not known", or responds with an http response status (step 510). If the client type can be retrieved from database 106 and therefore is known to the business logic 406 based on the User ID and a Device ID, the business logic 406 identifies end customer 402 associate with these IDs (step 512). The identifying step of step 512 is described in greater detail in method 800 of FIG. 8.

Figure 6:
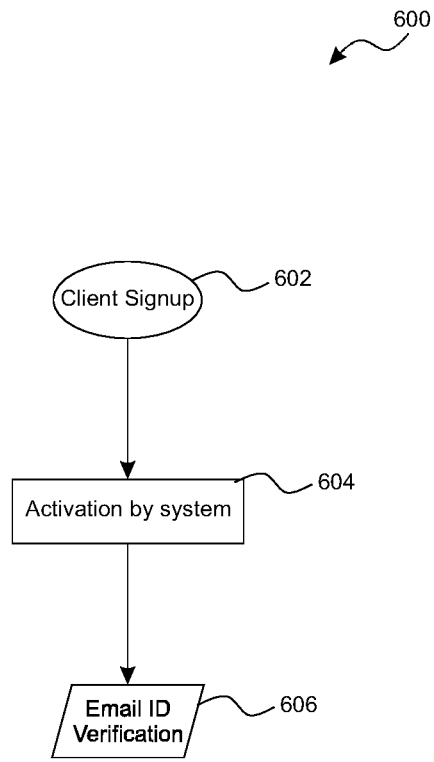
FIG. 6 is a flow chart showing an exemplary process of activating a client or an end customer.

FIG. 6 is a flow chart showing an exemplary process 600 of activating a client. The client can include third party web domain owners and online businesses. The client can include an end customer (end user). In the example of FIG. 6, a new client subscribes to the services provided by the BL 104 (step 602), for example, by providing required information, such as email ID, name and address of the client, etc., and may agrees to pay a fee for the various services of the BL 104 or business layer 406. The services of the BL 104 may be subscribed, for example, by downloading and installing the front end 103 on a web browser application of the client. In an example, the installed front end 103 is embedded with the browser used on the device of the client. In another example, the downloaded front end 103 is embedded within the website of the client, such as a third party online business that is logging into the BL 104. In another example, a first party website hosted or operated by the BL 104 is used to activate the client.

The BL 104 or the business logic 406 receives the required information from the client (at step 604). The BL 104 may also conduct email ID verification (step 606) with the email ID of the client. In some example, process 600 also allows the client to set out preferred sections of media, which may be modified by the client in the future in client-related configurations in the BL 104 or the business logic 406. After the client has subscribed to the services, the BL 104 may further configure the settings of the front end 103 with AUI 102, for example, based on the subscription of the client and the client's preference.

Figure 7:
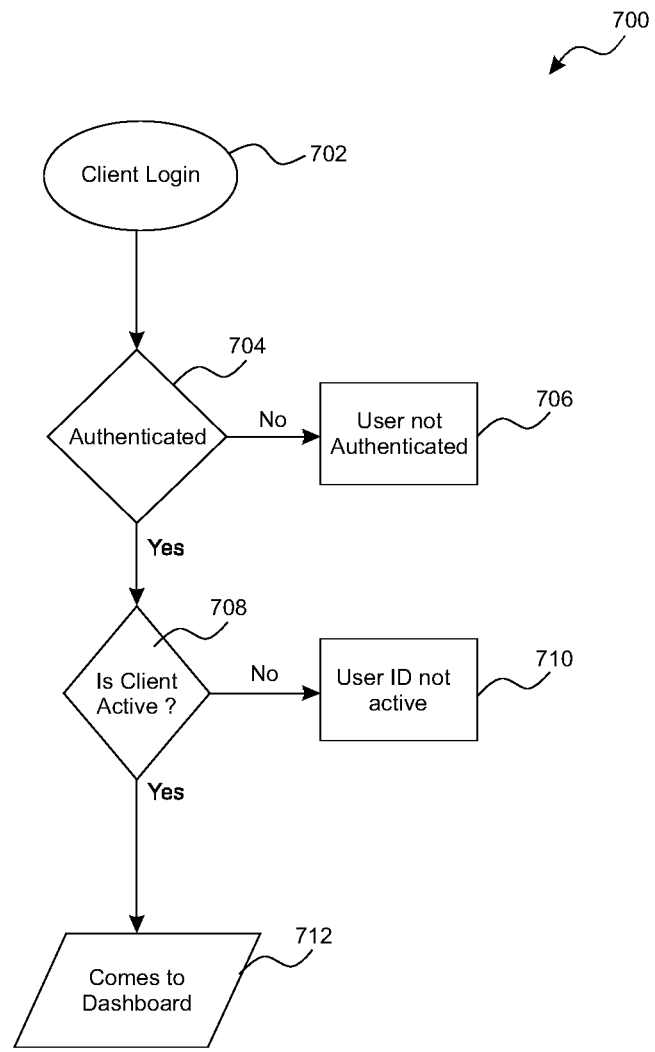
FIG. 7 is a flow chart showing an exemplary process for a user to access the system of FIG. 1.

FIG. 7 is a flow chart showing an exemplary process 700 for a user, such as a client, to access the system 100. After the user has been activated in system 100, in FIG. 7, the user first attempts to log into the system 100 with login credentials (step 702), for example, with a username and password, or a User ID, or a social media account. The login credentials may be generated by BL 104, or created by the user, when the user first subscribes to the services of the system 100. At step 704, the BL 104 authenticates the user by, for example, comparing the credentials provided in the login information of the user with those stored in system 100. In other examples, the social media account is authenticated by the social media provider. If the credentials provided by the user do not match those stored in the system 100, the user is not authenticated and BL 104 declines the user's login request (step 706). If the credentials provided by the user match those stored in the system 100, the user is authenticated to be a legitimate user and BL 104 continues to verify whether the user is active (step 708). If the User ID of the user in system 100 is not active (step 710), the BL 104 considers the user to be inactive and denies the user's request to access to system 100. If the User ID of the user in system 100 is active (step 710), the user is granted access to system 100, such as the dashboard (step 712), to access the services provided by system 100. The dashboard 712 may be used to show relevant information to the user, such as client sign in information and billing information, and to provide access to the client profile.

Figure 8:
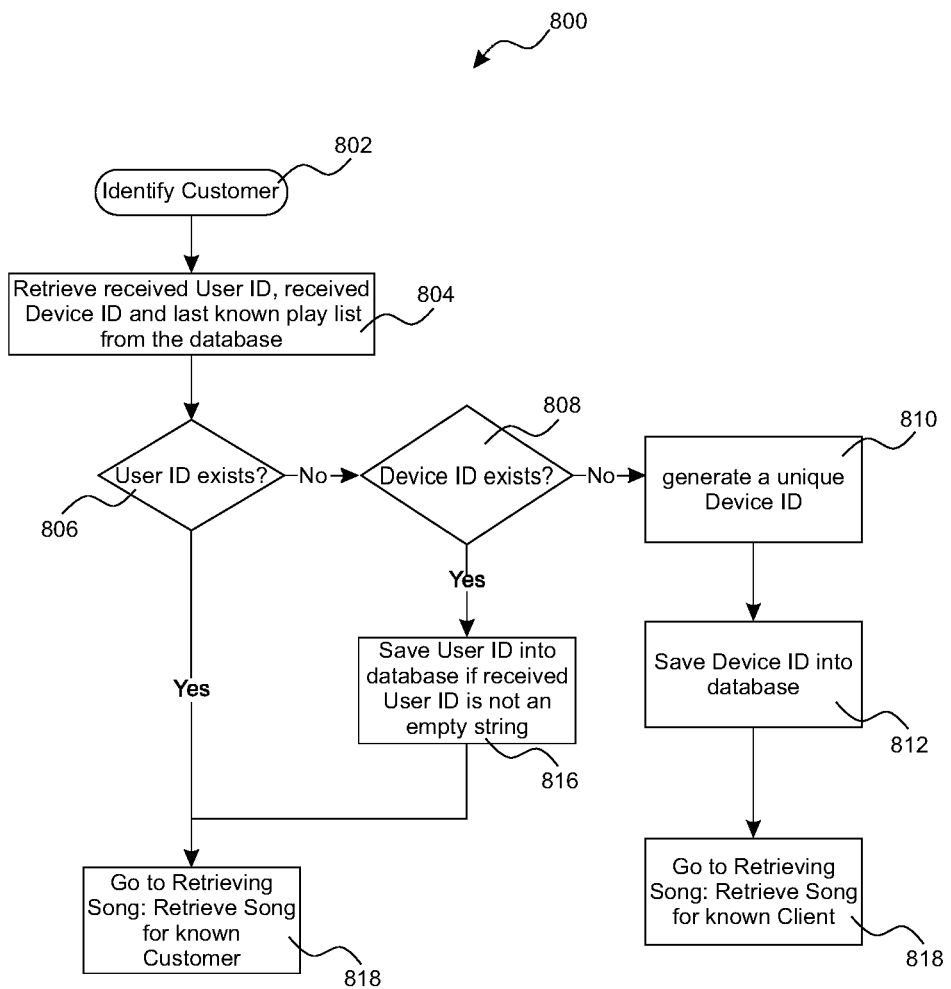
FIG. 8 is a flow chart showing an exemplary process of identifying an end customer.

FIG. 8 is a flow chart 800 showing an exemplary process of identifying an end user customer. In FIG. 5, after the user has been authenticated and identified at step 508, at step 512, BL 104 proceeds to identify end customer (step 802). BL 104 identifies and authenticates the end customer with the login credentials. At step 804, BL 104 retrieves from the database 106 the received User ID and received Device ID associated with the end customer from step 504, and last known playlist of the end customer. In case that User ID and Device ID in database 106 are empty strings, it is not necessary to retrieve User ID and Device ID from the database 106. In case the end customer has not logged onto business client's website, User ID may be an empty string, and Device ID may be a non-empty string. In other words, the end customer is identified by the Device ID as previously described. In an example, the playlist of the end customer is saved in the form of URLs, and each URL links to a specific medial file in the MS 122.

With the received User ID, BL 104 determines whether the User ID exists in system 100 by querying the database 106. If the User ID exists in the BL 104, namely that the User ID is a non-empty string, the front end 103 (end customer) proceeds to retrieve media, such as a song, from MS 122 (step 818). If the User ID does not exist in the BL 104, namely that the User ID is an empty string, the BL 104 proceeds to determine whether a Device ID associated with the end customer exists in the BL 104 (step 808). If the Device ID associated with the end customer exists in the BL 104, BL 104 saves the User ID in database 106 if the received User ID is not an empty string (step 816), and proceeds to perform step 818. If a Device ID associated with the end customer does not exist, BL 104 generates a new Device ID in association with the end customer (step 810), saves the new Device ID into database 106 of the BL 104, and proceeds to retrieve media, such as a song, for the identified end customer (step 818). As described herein, the Device ID may be an image of the browser settings of the device, or generated from a combination of the image of the browser settings and IP address of the device, or generated from a combination of the image of the browser settings, and the IP address of the device, and User Agent data of the device.

Figure 9:
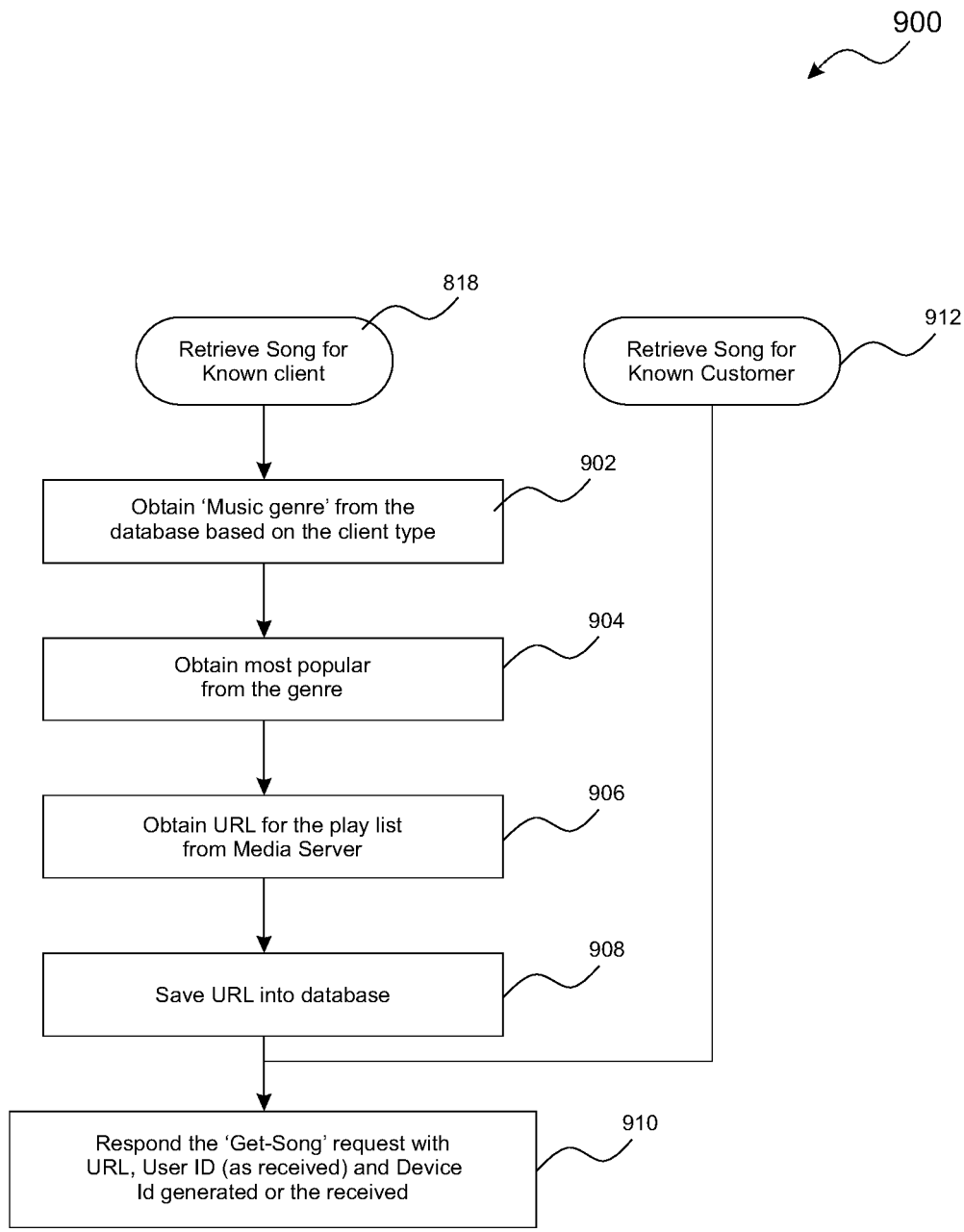
FIG. 9 is a flow chart showing an exemplary process of retrieving media for the identified end customer.

FIG. 9 is a flow chart showing an exemplary process of retrieving media for an identified end customer. From step 818, BL 104 obtains first information of the media, such as music genre, from the database 106 based on the client type of the third party web domain owner (step 902). BL 104 further obtains second information of the media, such as most popular from the genre ("playlist"), from the database 106 based on the client type (step 904). The playlist may be included in the API calls 412 to the MS 122. BL 104 may then obtain a weblink (e.g. URL) for the playlist from MS 122 via API calls 412 (step 906), and the URL may represent a media, such as a song, of a specific playlist. After the URL has been retrieved from MS 122, BL 104 saves the URL into database 106 (step 908). The backend 101 or the front end 103 may retrieve the media file using the URL from MS 122 for the identified end customer (step 912).

As well, in response to the request, such as "Get-Song", at step 504, BL 104 sends to the front end 103 the URL, User ID as received, and Device ID that may be generated by BL 104 (step 910).

In some examples, BL 104 obtains two URLs from MS 122, which represents two media files, such as two songs, and saves two URLs in database 106. This example also applies to more than two. BL 104 then sends to the front end 103 the two URLs, User ID as received, and Device ID. In this case, the front end 103 have two media files, such as songs, to be played. The two URLs corresponds to two media files in MS 122 and the two media files include a current media file and a next media file. The current media file is played prior to the next media file by the front end 103. In an example, immediately after the current media file has been played, or the current medial file has been skipped, the front end 103 can send a request Get-Next-Song and can retrieve the next media file represented by the second URL from the MS 122 and play the next media file. After the current medial file has been played, or the current media file has been skipped, if a URL for the next media file is not available for the front end 103, the front end 103 can send a request Get-Next-Song.

Figure 10:
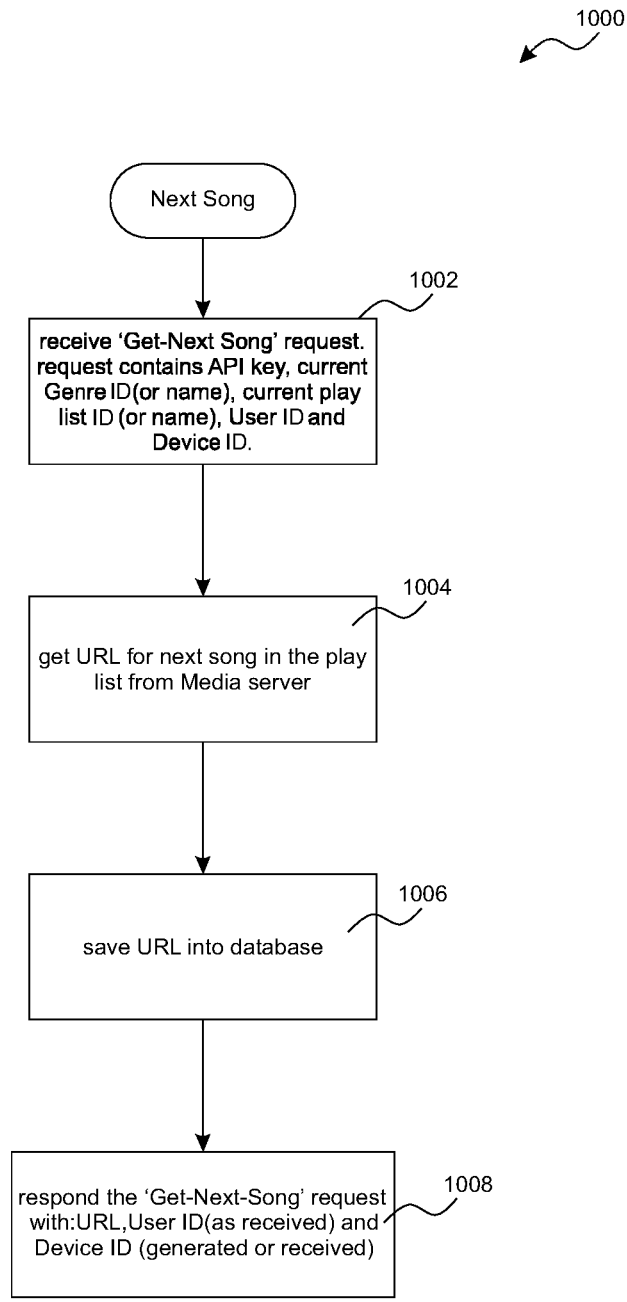
FIG. 10 is a flow chart showing a process of the system in FIG. 1 after a "Get-Next-Song" request is received.

FIG. 10 is a flow chart showing a process 1000 after the Get-Next-Song request is received from the front end 103. In FIG. 10, BL 104 receives a Get-Next-Song request from the front end 103 (step 1002). The request includes an API key, a current genre ID (or name), a current playlist ID (or name), User ID and Device ID. In some examples, the request includes an API key, the URL played, User ID and Device ID. At step 1004, based on the information contained in the request, BL 104 retrieves URL linked to the next media file in the playlist from MS 122 via an API call 412 to the MS 122 in similar manners described in step 906. BL 104 then saves the URL into database 106 (step 1006). In some example, each end customer may have two and more URLs. If an end customer has two URLs, a second URL may be saved to a new field of database 106, such as "2nd song" or "2nd media file", in association with the identified end customer. In response to the API calls 404 "Get-Next-Song" request, BL 104 then sends to the front end 103 of the identified end customer the URL, User ID as received, and Device ID that may be generated by system 100 (step 1008).

Figure 11:
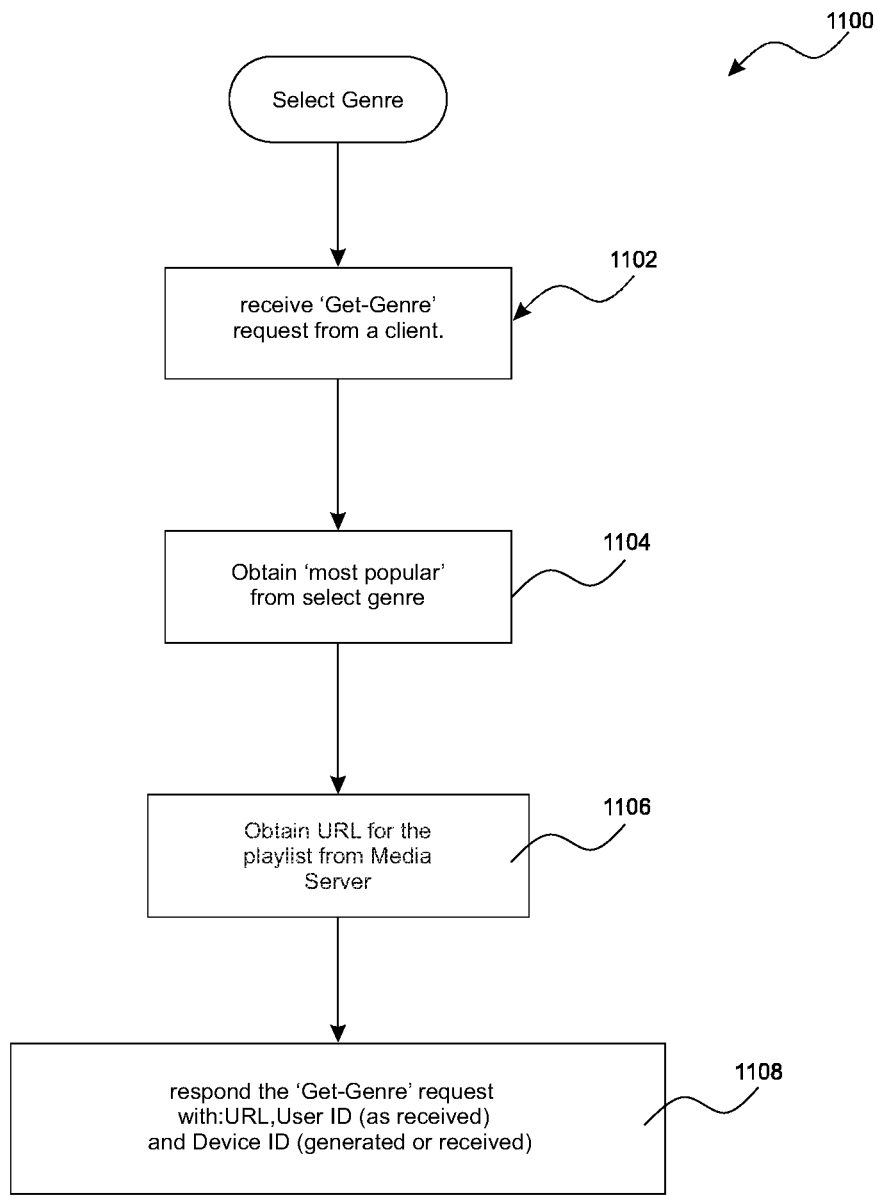
FIG. 11 is a flow chart showing a process of the system in FIG. 1 after a "Get-Genre" request is received.

FIG. 11 is a flow chart showing a process 1100 of system 100 after BL 104 receives a "Get-Genre" request from the front end 103. The process 1100 may apply to an audio media file, such as a music file. According to the process 1100, BL 104 receives a "Get-Genre" request from the front end 103 associated with an end customer (step 1102). The request may include information related to the end customer, such as an API key, a selected genre ID (or genre name), a User ID and a Device ID. BL 104 obtains information of the media from the selected genre, such as most popular from the genre ("playlist"), from the database 106 (step 1104). The playlist may be included in the API calls 412 to the MS 122. BL 104 may then obtain a URL for the playlist from MS 122 via API calls 412 (step 1106), and the URL may represent a media, such as a song, of a specific playlist. In response to the "Get-Genre" request, BL 104 sends to the front end 103 the URL, User ID as received, and Device ID that may be generated by BL 104 (step 1108).

In some examples, the web browser window 202 may show the contents of an online business during the genre selection and media playing process of system 100. The media player interface of system 100 in the web browser window may be playing in a separate window 201, or not playing during this process.

Settings of the BL 104 may be configured by different users. Different levels of users may access different screens of BL 104, for example, via AUI 102. In some examples, screens of BL 104 may include System setting module, which is accessible to system and "Client's Admin Users Only", and Client Management/Multiple Lists Screen. Client Management/Multiple Lists Screen may include search function by querying database 106. Client Management/Multiple Lists Screen may further include: a. Full Details View Screen with Add/Update Screen (accessible to system and "Client's Admin Users Only"), b. Music Management (accessible to system), c. DB Query Console (accessible to system), and d. Manage Profile (accessible to "All"). Music Management may include different content selections, such as "radio" or "Genre".

The provider of system 100, and "Client's Admin Users Only" are examples of the administrator of system 100. Client in the case of "Client's Admin Users" includes online business and end customers that have subscribed to the services of system 100. "All" includes the administrator of system 100, the subscribed online business and end customers, the end user browsing the websites of the subscribed online business, and other parties obtained access to system 100 from the administrator.

A subscribed user registered with system 100 may login to system 100 via a login interface of system 100, such as a webpage, or other user interfaces. The login interface applies to the subscribed users, such as online business, subscribed end customers, and system administrator. The subscribed online business, subscribed end customers, and system administrator may log into system 100 by providing required information in order to identify the subscribed users. For example, the required information may include email address, user name, password, and so on. If a potential user, such as an online business, or an end customer, which has not subscribed or has not registered with the services of system 100, the online business, or the end customer may use a signup interface to sign up with system 100 by providing required information, for example, name, company name, company website, email address, and password set by the potential user. The required information for logging in and signing up with system 100 may be varied as long as system 100 can sufficiently identify the user and the website of the user to be associated with the services provided by system 100. Since there are multiple end users associated with one online business client, additional information may be provided by an Account Manager who has additional information about the online business client.

In some examples where end customers have high privacy setting, the registered websites in system 100 may install an Asynchronous JavaScript and eXtensible Markup Language (XML) (AJAX) Plugin and embed the front end 103 in the static part with website content opened using the AJAX Plugin. In some examples, AJAX Plugin blocks a web browser window from refreshing and thus prevents a media file from playing at the beginning of the media. In some examples, AJAX Plugin functions as a bookmark to indicate the previous stop points of media file.

In an example, the BL 104 identifies a user device and generates the Device ID. A browser fingerprint (image of browser settings), User Agent data, and the IP address (typically the router IP address) are determined by the BL 104. Other example browser IDs can be used other than the browser fingerprint. The combination of the browser fingerprint, User Agent data, and router IP address is used to generate the Device ID, which is unique to the device when it is accessing the BL 104.

The browser fingerprint of the user device can be determined by the BL 104 using the JavaScript™ function "Fingerprintjs2", which is a unique JavaScript™ fingerprint of the browser settings of the user device in the form of a hexadecimal sequence, as understood in the art. The User Agent data of the user device is determined by the BL 104 from a HTTP request header received from the front end 103, and which includes the application type, operating system, software vendor or software version of the user device. In an example, the Device ID can be generated by aggregating this combination, optionally along with other computations (e.g. hashing). In various examples, one, two or three of the three parameters of the combination are used to generate the Device ID. More parameters can be used in other examples.

The BL 104 may present different information to a user via various dashboard screens. In some examples, BL 104 may include a dashboard home screen, and information of BL 104 or client may be collected and illustrated on the home screen in a user-friendly manner. For example, some data may be illustrated with diagrams or chart. The dashboard home screen may include information, such as "System Settings", "Profile Management", "Admin Activities" related to "Music", "Clients", and "Query", "Reports" related to some or all of the information related to system 100, and "Billing", etc.

In some examples, BL 104 may include a dashboard client management screen as a sub-screen of the dashboard home screen. For example, the client management screen may allow system administrator to search subscribed clients, to display information related to the client of interest, such as client's name, status, account manager, and to manage the client, such as deactivating a client and managing playlist associated with the client.

In some examples, BL 104 may include a dashboard administrator screen related to music management for radio of system 100 as a sub-screen of the dashboard home screen. The dashboard administrator screen allows a user to select available radio in the region of the client. The available radio station may be displayed by radio channel name, etc. In some examples, BL 104 may include a dashboard administrator screen related to music management for genre of system 100. The screen allows a client create playlist, upload third party playlist, and configure welcome/promotional message, etc. Welcome/promotional message may be configured in a separate configuration window which allows a client to upload a media file to a sever, such as in database 106 of BL 104, to set number of media files, such as songs, to be played in between message, and date of expiry of the media file.

The welcome/promotional message may include, for example, local deals, Giveaways, Store Sales, Current deals etc. The welcome/promotional and/or personalised message may also include sale confirmation message such as "Thank you for the order" or "You saved $20" or "hope to see you soon". The configured personalized greeting message or welcome/promotional message may be delivered to the end customer in text or voice, for example, by using the Artificial Intelligence Speech to text application or by recording the voice message.

In an example, BL 104 offers personalized greeting message to the end customer when an end customer logs into system 100, by recording the greeting message (e.g., from the CEO or VP) that welcomes the end customer for online shopping or by using the Artificial Intelligence text to speech application in welcome/promotional message.

In another example, system 100 can promote products. Once the purchase is made, system 100 can be used as a confirmation platform. In some conventional cases, this is offered by the salesperson in the brick and mortar store. System 100 enables confirmation communication with the end customer, such as by playing the audio "you got a good deal" or "With 10% off, you saved $20 today". These messages reinforce the savings for the end customer and provide the end customer with similar experience as in a brick and mortar outlet.

Once the end customer logs out, BL 104 may also configure the welcome/promotional message by thanking the end customer and along with an offer to come back, for example "thank you", "Have a nice day", "Merry Christmas and Happy New Year," "hope to see you soon," etc.

In some examples, BL 104 may include a dashboard upload third party playlist screen as a sub-screen of the dashboard home screen. The dashboard upload third party playlist screen allows a client to choose a media file, such as songs, to be uploaded to system 100, such as in database 106 of BL 104.

In some examples, BL 104 may include a dashboard database query console screen as a sub-screen of the dashboard home screen. With the dashboard database query console screen, a client may select the tables of database, such as database 106, and the fields of the selected tables such as columns of the selected tables, and then query the information in the selected fields. For example, the tables may be related to clients, visits, genres, playlists, songs, system settings, and system users.

In some examples, BL 104 may include a window for the end user to request specific media file, such as a song, to be played for the end user. BL 104 then retrieves the media file for the end user, for example, with the API call 412 to the MS 122. In this process, if the end user is not registered with the online business, the requested media file, such as a song, can be embedded or aggregated with additional audio advertising information, e.g., contact information of the owner of the registered website, such as email or a phone number.

In other examples, BL 104 may cross validate the online end customer even before the end customer has signed in system 100, in order to provide promotional opportunities to the online business, such online retailers. For example, most online businesses have loyalty programs or customer profiles for signing on into their databases. The signing in/up occurs just prior to checking out. Front end 103 starts playing a media file, such as a song, as soon as the end customer appears or comes online. BL 104 may then cross validate an end customer after the end customer signs in or during the online shopping period. For example, by analyzing the information stored in the database 106 of system 100, BL 104 determines preferences of an end customer, and communicates the preferences of the end customer to relevant online business. The online business may then provide products that are tailored to the preferences of the end customer to increase sales.

Referring again to FIG. 1, front end 103 may include a screen sharing application 111 for providing web screen sharing services. In some examples, the screen sharing application 111 is composed by Javascript™ codes embedded in the web page, for example, or in other examples as browser extension or browser addon of the web browser application. With screen sharing application 111, a person may share their web screen in real time with one or more people. Web Screen sharing can be Person A sharing with Person B, or Person B may be multiple people. All references to a "person" similarly apply to the function or operation performed by their respective devices.

Many existing conventional screen sharing applications typically takes a snapshot picture of a screen and shares the whole screen with others irrespective of the type of program, applications and information being displayed. Therefore, those existing screen sharing applications are data intensive, and sometimes require additional software to be downloaded on computer.

After customer (Person A) signed up with system 100 for the web screen sharing services, the user subscribes screen sharing application 111. The process of signing up with system 100 is same as the process described above in FIG. 6, for example. In some examples, screen sharing application 111 included in the front end 103 may be embedded in the website or web page on the device associated with the user subscribed with the services. In some examples, screen sharing application 111 may be embedded in a website or as a web browser extension, for example on the right hand side of the webpage, and share the websites or webpages with one or more people.

Figure 14:
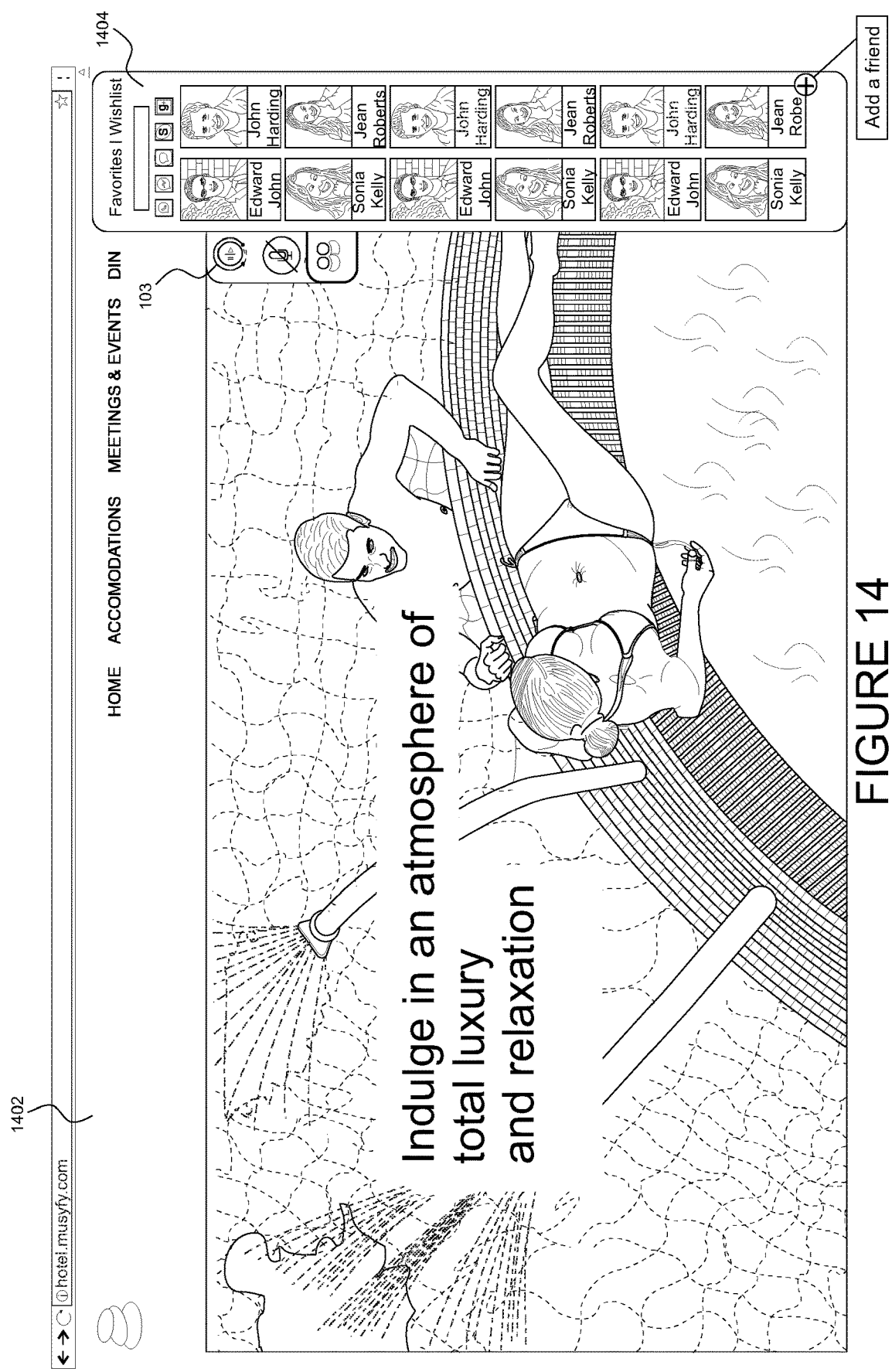
FIG. 14 is an exemplary interface of the system of FIG. 1 for Social Shopping, shown with "Favorites" people tab in a side toolbar of a webpage for single click quick connections.
Figure 15:
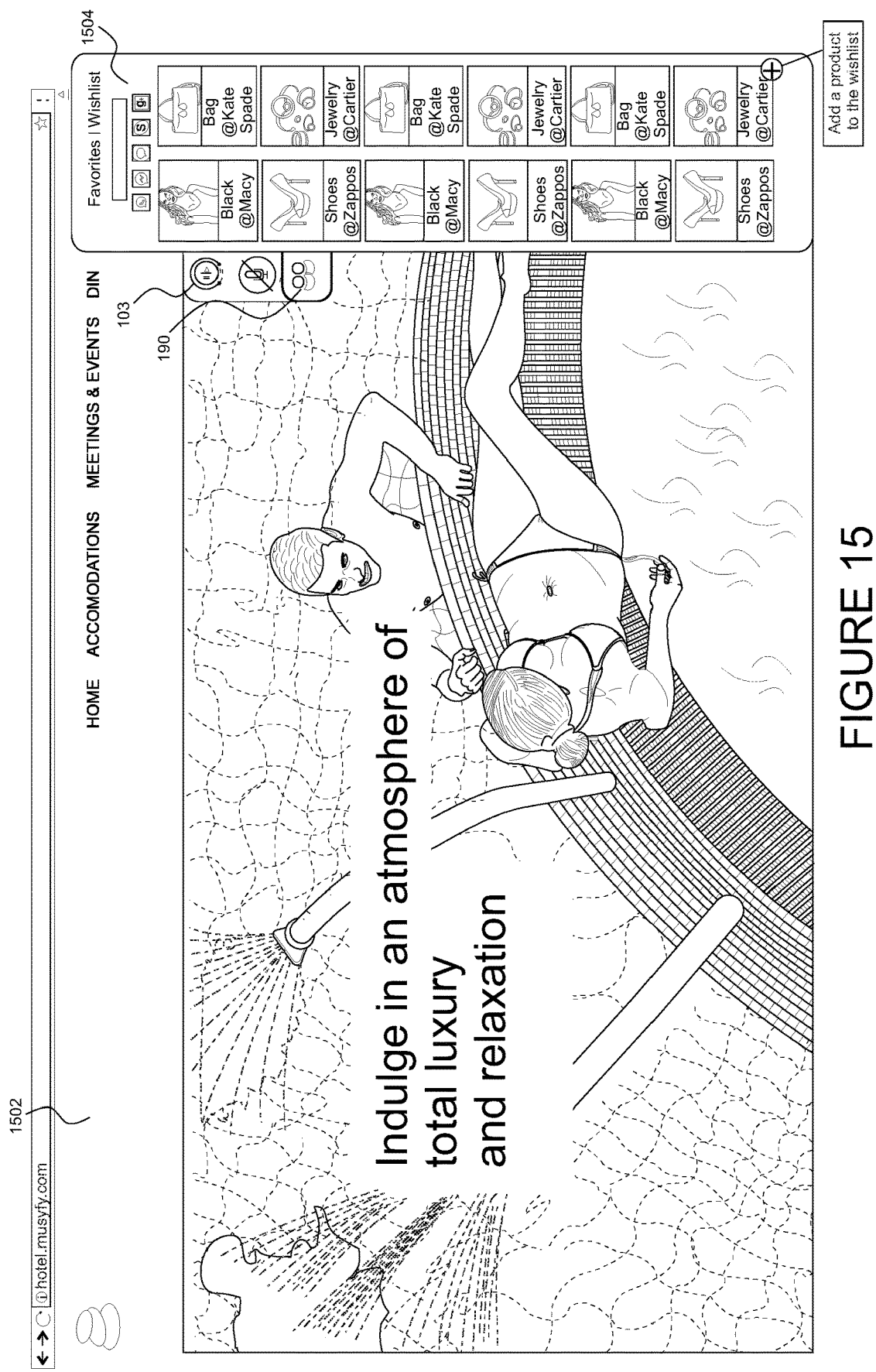
FIG. 15 is a further exemplary interface of FIG. 14 for Social Shopping, shown with "Wishlist" products tab in the side toolbar for single click quick recall.

FIG. 14 is an exemplary webpage 1402 of the front end 103 of the system 100 of FIG. 1 for Social Shopping, shown with Favorites people for single click quick connections 1404. FIG. 15 is a further exemplary webpage 1502 of the front end 103 of FIG. 1 for Social Shopping, shown with Wishlist products for single click quick recall 1504.

As illustrated in FIG. 14, an example web domain for the screen sharing application 111 is "hotel.musyfy.com", which can comprise a first-party web domain "Musyfy.com" with a third-party browser extension "Hotel" which is implemented by the front end 103. A browser extension 1404 is a plug-in that extends the functionality of the web page 1402. The browser extension 1404 shown is a browser toolbar. In various examples, the front end 103 may or may not include MP 110 and/or PC 112. Similarly, in FIG. 15, "hotel.musyfy.com" is an example web domain for the screen sharing application 111. The browser extension 1504 is a plug-in, e.g. having a toolbar in this case, that extends the functionality of the webpage 1502.

In some examples, if screen sharing application 111 is embedded in the website, no additional software has to be downloaded by the sender (Person A) or receiver (Person B). If screen sharing application 111 is embedded in the browser extension, only a one-time software installation by Person A is required, which can be Java code or other suitable code.

References are made to FIGS. 12(*a*), 12(*b*) and 13. FIG. 12(*a*) is a diagram of a web screen sharing system, according to an embodiment, wherein scroll position is matched between Person A and Person B, and the web browser window size and position are unchanged in Person B. FIG. 12(*b*) is a diagram of a web screen sharing system, according to an embodiment, wherein a plurality of webpage view settings, including the scroll position, web browser window size and position, are matched between Person A and Person B.

When browsing the web page 1210, Person A opens a web page 1216 having at least one web browser window embedded with the front end 103 including the screen sharing application 111. The web browser window has a window width and a window height. Person A may initiate the screen sharing application 111, for example, by clicking a control button on the front end 103 with the screen sharing application 111 embedded in the webpage 1216. The BL 104 requires Person A to log into the system 100. After BL 104 has verified the login of Person A, Person A may access screen sharing application 111 (step 1302). The process of signing up with system 100 is same as the process described above in FIG. 7. In some example, if Person A has logged into system 100 once, all of the subscribed services are available to Person A.

Figure 12A:
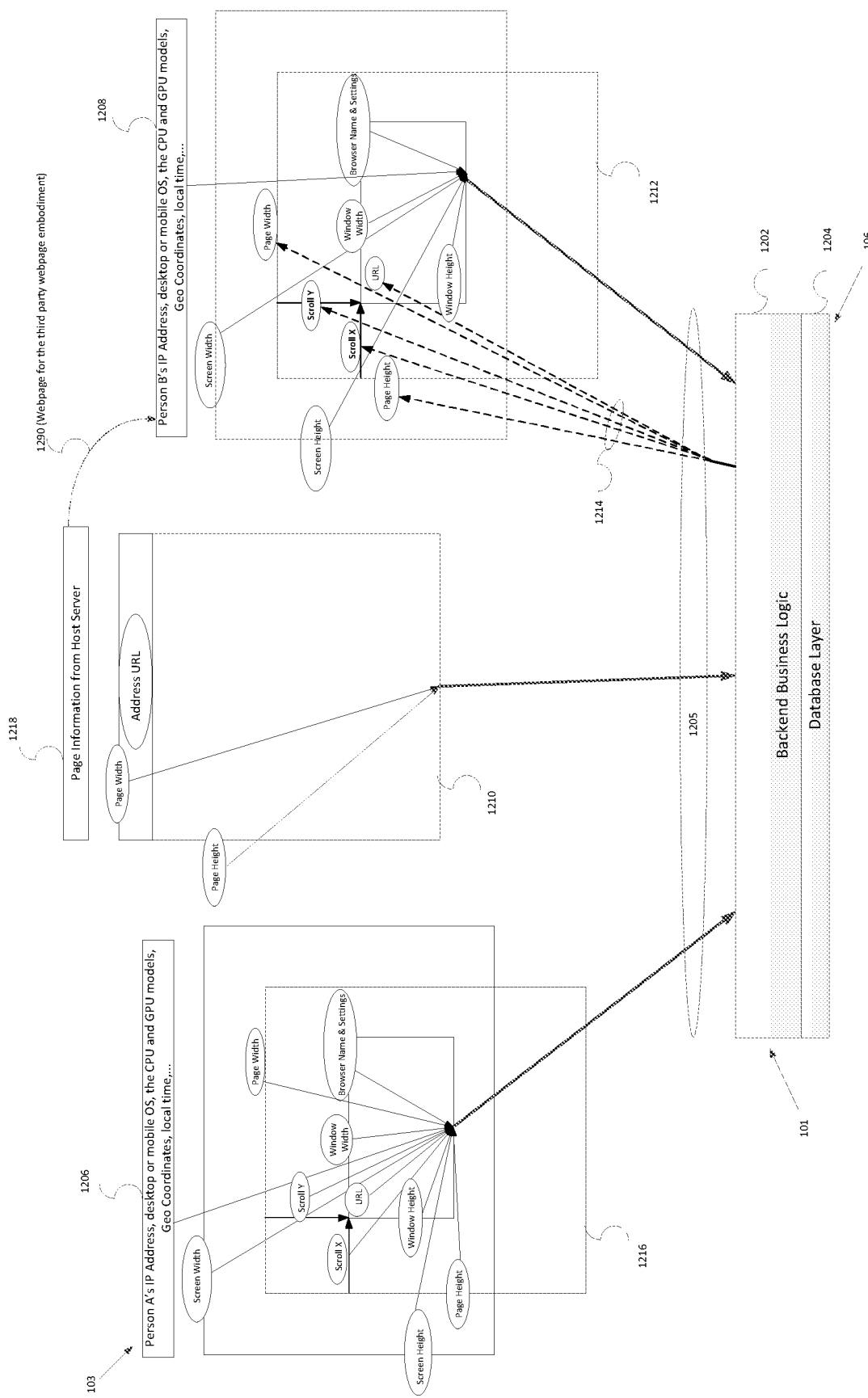
FIG. 12(*a*) is a diagram of a web screen sharing system, according to an embodiment, wherein scroll position between a receiving device and a sending device are matched, and a web browser window size and position are unchanged in the receiving device.
Figure 12B:
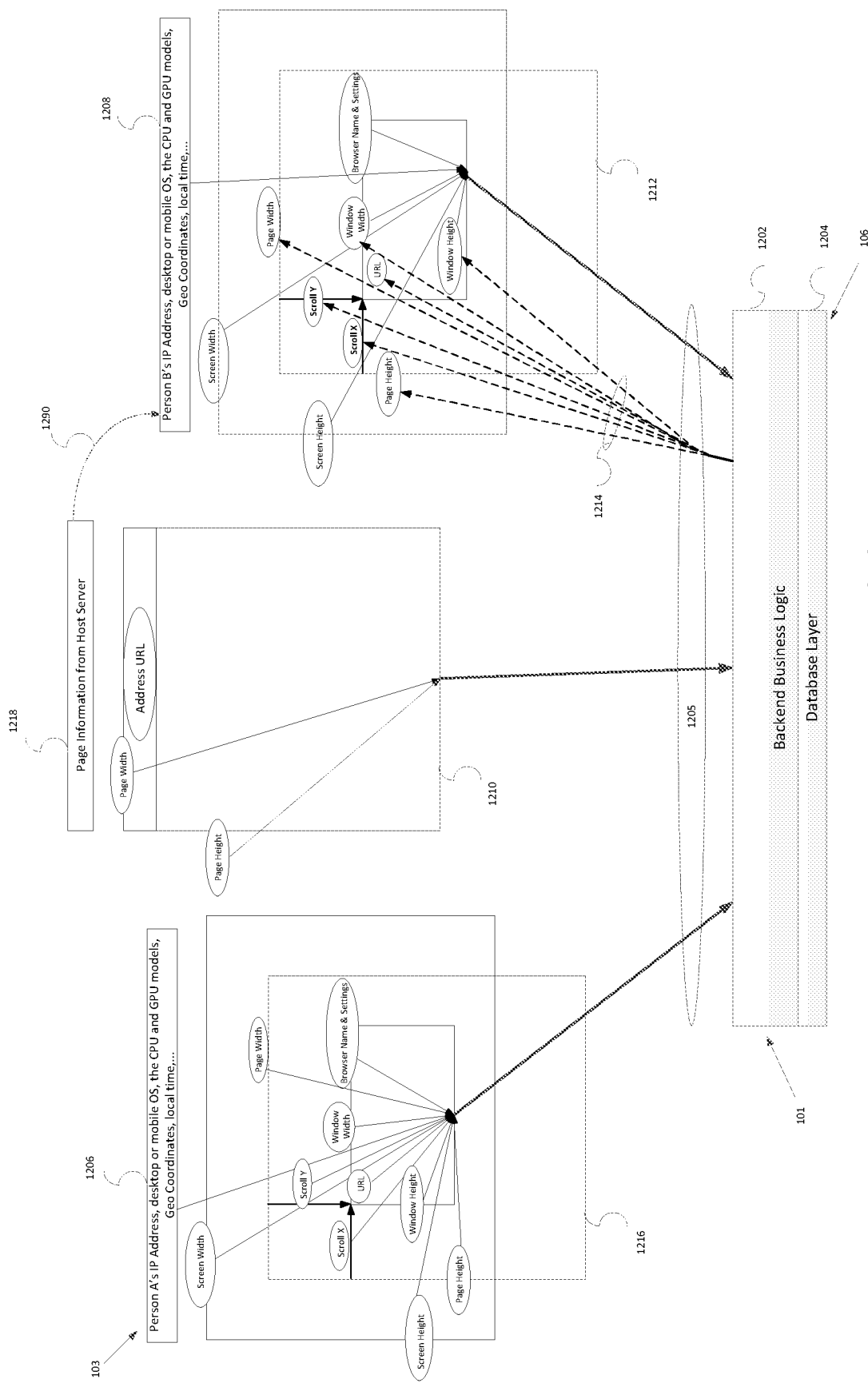

In the examples of FIGS. 12(a) and 12(b), after Person A logs in system 100 and starts screen sharing application 111, the front end 103 may collect information of Person A and communicate, via a communication network 1205 such as the Internet, with the BL 104. In this example, Person A is browsing a third party webpage 1210 of a third-party host server 1218. The third-party webpage 1210 is loaded with the front end 103 and is registered with the BL 104. In the examples of FIGS. 12(a) and 12(b), the front end 103 collects and sends to Backend Business Logic (BBL) 1202 webpage information related to Person A via the communication network 1205, such as current Uniform Resource Locator (URL) of the webpage 1210, screen width and height of Person A's device 1206, the window width and height of the web browser window, the web browser window position (Window Screen Top, Window Screen Left) on the screen of Person A, the webpage width and height of the webpage 1216, and the coordinate of the scroll X and Y (Step 1304). In some examples, webpage information related to Person A that the front end 103 collects and sends to Backend Business Logic (BBL) 1202 includes the locations of the web browser window position on the screen of Person A 1216 (Window Screen Top, Window Screen Left). The BL 104 in the example of FIGS. 12(a) and 12(b) includes the Backend Business Logic (BBL) 1202, Database Layer (DL) 1204. In some examples, the DL 1204 may include database abstraction (DA) 408, and database 106. The BBL 1202 and DL 1204 are an example of BL 104 (FIG. 1) as described above. With the information of Person A, the front end 103 sends BBL 1202 the URL of the webpage 1210 Person A is browsing, the dimensions of the webpage 1216 of Person A, the screen width and height of Person A 1206, the Window Width and Height of Person A 1216, the web browser window position (Window Screen Top, Window Screen Left) on the screen of Person A, and the relative position of the contents of the webpage 1216 of Person A is browsing based on the position of scroll X and Y. In some examples, the Page width and Page Height of the webpage 1210 can be collected from the third party Host Server 1218 via the communication network 1205 such as internet. Any changes to these parameters on the webpage 1216 of Person A are received the BBL 1202, and the BBL 1202 causes these same changes to be changed on the web browser of Person B. Note that some websites only have scroll Y, but is still referred to as scroll X and Y herein.

In some example, the front end 103 may also collect and send additional information of Person A including IP address, the operation system of the Person A's device, such as a desktop or a mobile device, the models of the Central Processing Unit (CPU) or Graphics Processing Unit (GPU) used in the Person A's device, geographical coordinates and local time of Person A, and browser name and settings of Person A's device 1206 to BBL 1202 through Communication network 1205. In some examples, the additional information may be used for determining and displaying the new scroll X and Y coordinates of the webpage for Person B, based on the devices used by Person A and Person B. For example, Person A may use a computer while Person B may use a mobile phone. The information of the shared webpage may be displayed on the Person B's device according to the device used by Person B so that webpages displayed on the devices of Person A and Person B have the same contents, wherein the browser of Person B uses the information to effect the same ratio and proportion of the size and scroll X and Y coordinates, and/or web browser window position on the screen (Window Screen Top, Window Screen Left). Any changes to these parameters on the webpage 1216 of Person A are received the BBL 1202, and the BBL 1202 causes these same changes to be changed on the web browser of Person B.

In other examples, this additional information of Person A may be used for cross validating a customer, such as Person A, even before the customer has signed in to the system 100, for example, by using the link and/or Person A's device information, IP Address and Browser Settings to uniquely identify Person A or Person A's device. The information can be used to determine a Device ID of Person A as described herein, in order to uniquely identify Person A (with or without requiring login by Person A, or to identify Person A from past use of the Backend Business Logic (BBL) 1202 prior to Person A even registering). As mentioned, the Device ID can be based on, for example, image of browser settings and/or IP address of the device and/or User Agent data, and/or this additional information. Therefore, in some examples, the Device ID can be used to, for example, uniquely identify the customer, welcome the customer with their name, ask them if they are who we think they are and even without having them signed in and link the future activity like shopping with the customer even without them having signed in.

In some examples, the backend 101 may receive webpage information, the additional information, and/or the webpage view settings of the webpage 1216 displayed on the Person A's device simultaneously or prior to or subsequent to detecting selection of the link by the Person B's device.

In some examples, the webpage information, the additional information, and subsequent information may be associated with a timestamp to indicate the time when the front end 103 sends the information to BBL 1202. With the timestamp, the BBL 1202 may determine the latest information related to the Person A.

BBL 1202 may save the received information from the front end 103 in the DL 1204, such as in database 106. This information of Person A can be used to determine the Device ID, in some examples. This information of Person A can also be used to select the particular media to play on the devices of Person A and Person B, in some examples. In some examples, the BL 104 may continuously save any changes in the webpage information and/or additional information received from the front end 103 in the database 106.

If Person A would like to share the webpage 1216 with the same view setting as his or her web browser window with Person B, Person A may initiate the web page sharing process with one or more selected persons, e.g. Person B as shown. For example, Person A may click one or more contacts on a contact list of Person A. The contact list is appeared in the front end 103 including screen sharing application 111, such as friend list of Person A. If a person with whom Person A would like to share the webpage is not on the contact list, Person A may add the person's information in the contact list or friend list. After Person A selects Person B, the BBL 1202 may generate a link containing the webpage information. The link may include a link control button, and/or a webpage address. BBL 1202 may send, via communication network 1205, the link to the selected Person B (step 1306), such as sending the link to Person B's device 1208, for example, via at least one of an email, phone, social media platform(s), such as Facebook™, WhatsApp™, text message, or other communication methods. When Person B receives and clicks on the link, a webpage 1212 may be opened. The front end 103 of Person B may communicate with the BBL 1202. The BBL 1202 may authenticate the link sent to Person B is a legitimate link from a signed up user, for example, by determining that the link is originated from Person A. The BBL 1202 may retrieve, as illustrated in webpage 1212, screen and browser window information of Person B from device 1208 of Person B, such as screen width and height of the device 1208, the window width and height of the web browser (step 1308), the web browser window position (Window Screen Top, Window Screen Left) on the screen of Person B.

In some examples, the link may include the link button and/or webpage address to go to. The link may include an address to the first party webpage. In some examples, the back end 101 may receive a third-party webpage from a third-party host server 1218, and generate a first party webpage including the third-party webpage rasterized as an image within the first party webpage. The backend 101 may send the first party webpage to the Person B's device in response to the link being selected by the Person B's device.

In some examples, in parallel to sending the invite to Person B, the back end 101 requests the rasterized image of the Person A's browser window to Person A's front end 103 based on the browser window location on the screen of Person A's device. In response, the front end 103 prepare the image and sends to the back end 101. The back end 101 saves the rasterized image in the DL 1204, such as in database 106. Any changes in the webpage display on Person A's device screen triggers an update to the rasterized image and the changes are communicated to the back end 101 and saved in the DL 1204, such as in database 106. In some examples, the last five rasterized images are saved in the DL 1204 and rest are purged.

In some examples, as an alternative that the back end 101 does not sends the last saved Person A's webpage domain URL information to the Person B's front end 103 as described above, the back end 101 uses inline frame option, prepares a First Party webpage, such as "musyfy.com/sender", with the most recent or latest rasterized image saved in the DL 1204, such as in database 106, for Person B. The back end 101 sends the First Party domain address link, such as "musyfy.com/sender", to Person B's front end 103. The back end 101 may notify Person A when or after Person B has joined the screen sharing. Person B's front end 103 may loads the First Party Webpage such as "musyfy.com/sender". The back end 103 may continuously update the First Part Webpage, such as "musyfy.com/sender", with the latest Rasterized Person A's Browser Screen. The updated First Part Webpage may be displayed by the Person B's front end 103.

In some examples, Person B may send to BBL 1202 additional information related to the Person B's webpage 1212 via the communication network 1205, including the IP address, the operation system, such as a desktop or a mobile device, the models of the Central Processing Unit (CPU) or Graphics Processing Unit (GPU) used in the device 1208, geographical coordinates and local time of Person B. In some examples, the additional information may be used for determining and displaying the new X and Y coordinates of the webpage for Person B, based on the devices used by Person A and Person B. For example, Person A may use a computer while Person B may use a Mobile phone. The information of the shared webpage may be displayed on the Person B's device according to the device used by Person B so that webpages displayed on the devices of Person A and Person B have the same contents. In other examples, the additional information may be used for cross validating a customer, such as Person B, even before the customer has signed in to the system 100, for example, by using the link and/or Person B's device information, IP Address and Browser Settings to uniquely identify Person B and Person B's device. BBL 1202 may save the received information from the front end 103 of Person B in the DL 1204, such as in database 106. This information of Person B can be used to determine the Device ID, in some examples, for unique identification of Person B. This information of Person B can also be used to select the particular media to play on the devices of Person A and Person B, in some examples.

In some examples, the webpage information, the additional information, and subsequent information may be associated a timestamp to indicate the time when the front end 103 of Person B sends the information to BBL 1202. With the timestamp, the BBL 1202 may determine the latest information related to the Person B.

After the link received by the Person B's device is clicked by Person B, a new web browser window of the webpage 1212 is generated by the BL 104 and code for the new webpage 1212 is transmitted to Person B. In some examples, the code from the backend 101 to the Person B's device may include an address of a third-party host server, such as 1218, for the Person B's device to retrieve the third-party webpage from the third-party host server.

In some examples, the backend 101 is further configured for receiving a width and height of the third-party webpage from a third party host server, such as server 1218.

In some examples, the BL 104 may notify Person A that Person B has joined the screen sharing process after the Person B has clicked the link. In some examples, the front end 103 on the Person A's device is configured to receive a message from the backend 101 that the link was selected by the Person B's device, and output an indication on the Person A's device to show that the Person B's device is web screen sharing the web browser window with the Person A's device. The webpage 1212 is opened on the device of Person B using the Person A's webpage settings, and in some examples is appended or marked with the original web page address or URL of the webpage 1210 (step 1310) (note: step 1310 having the appended or marked original URL is shown in FIGS. 12(*a*) and 12(*b*) but not shown in FIG. 14 or 15). In some examples, the BL 104 may send the latest web page address or URL of the webpage 1210 based on the timestamp. In some examples, the backend 101 receives, from the Person A's device, webpage view settings of the third-party webpage 1216 displayed on the Person A's device comprising width and height of the first web browser window that is displaying the third-party webpage 1216, and first scroll X and Y positions of the first web browser window that is displaying the third-party webpage 1216 on the screen of Person A.

In the example of FIG. 12(*b*), the browser window height and width setting can be made to be the same relative window size for Person A and Person B, along with the same webpage view settings. Alternatively, as shown in FIG. 12(*a*), the browser window height and width settings are not modified and are kept as they are, but only the page view settings are modified so that Person A and Person B view the similar location on the webpage.

In the example of FIG. 12(*a*), the BBL 1202 may send in 1214 the updated webpage width and height, the URL, and Scroll X and Y for displaying the shared webpage on the screen of Person B's device. In this example, the Person B's device uses the original web window height and window height, and original web window position, already displayed within the web browser application of Person B's device, without modification of the window width and widow height, or web window position, being displayed on the shared webpage.

In the example of FIG. 12(b), the BBL 1202 may send in 1214 the updated webpage width and height, ULR, Scroll X and Y, window width and window height, and web browser window position on the screen, for displaying the shared webpage on the screen of Person B's device. In this example, the Person B's device uses the modified web window height and window height as provided by the BBL 1202.

In some examples, referring to FIG. 12(b) the new web browser window of the webpage 1212 of Person B has the same relative height and width of the webpage 1216 on Person A's screen, for example, by using window "resizeTo( )" code with the width and height of Person A's webpage 1216. In some examples, the backend 101 may transmit, to the device of Person B, code for displaying of the webpage 1210 on the web browser window of the Person B's device. In some examples, the backend 101 may also transmit to the Person B's device webpage view settings for displaying of the webpage 1212 on the Person B's device to effect a same relative webpage view setting as the view settings of the webpage 1216 displayed on Person A's device. The webpage view settings transmitted to the Person B's device may include updated width and height of the web browser window on the Person B's device and updated scroll X and Y positions of the web browser window on the Person B's device. For example, using the webpage view settings transmitted from the backend 101, Person B's device may display a web browser window on the Person B's device with the updated width and height of the web browser window, and with the updated scroll X and Y positions. In some examples, the backend 101 derives the updated width and height of the web browser window and updated scroll X and Y positions based on size of the webpage 1216 displayed on the Person A's device, the relative position of the webpage 1216 on the screen of the Person A's device, the screen size of Person B's device, so that the webpage 1212 is similarly displayed on the Person B's device in relation to the overall screen size of the Person B's device, and thus the webpage 1212 has a same relative webpage view setting as the view settings of the webpage 1216 displayed on Person A's device. For example, if the top left corner of webpage 1216 displayed on the Person A's device is ¼ below the top edge and ¼ right from the left edge of the screen of Person A's device, the top left corner of webpage 1212 is also displayed on the Person B's device is ¼ below the top edge and ¼ right from the left edge of the screen of Person B's device. In some examples, the size of the webpage 1216 is proportional the size of the screen of Person A, and the size of the webpage 1212 has the same proportion to the size of the screen of Person B, for example, as set in the updated width and height of the web browser window, and with the updated scroll X and Y positions on Person B's device. As some webpages may have text shifting that depends on the size of the web browser window, the backend 101 can accommodate for the text shifting when determining the scroll X and Y positions of Person B's device, so that approximately the same text is being displayed concurrently to Person A and Person B.

In some examples, the backend 101 determines the same relative webpage view setting, for example, by calculating a proportion of the width and height of the web browser window to the screen width and height of the Person A's device. The backend 101 may also determine a same proportion of the second width and height of the second web browser window to the second screen width and height of the Person B's device.

In the case of FIG. 12(a), the webpage 1212 is displayed on the screen of Person B with the existing web browser window size and position of Person B. In such a case, the webpage 1212 is displayed on the screen of Person B with the scroll X and Y positions that generally correspond to what is seen on the screen of Person A. The web browser window size and position of Person B are not changed in this example.

In the case of both FIG. 12(a) and FIG. 12(b), in some examples, when the webpage view settings of the webpage 1216 are changed in the Person A's device, for example, the change of position of the webpage 1216 in relation to the screen of the Person A's device, or the change of width or height of the webpage 1216, the backend 101 receives, from the Person A's device, subsequent to the detecting selection of the link by the Person B's device, update to the webpage view settings of the webpage 1216 displayed on the Person A's device. The backend 101 may re-derive the width and height of the web browser window and scroll X and Y positions for the webpage 1212 based on size of the webpage 1216 displayed on the Person A's device, the relative position of the webpage 1216 on the screen of the Person A's device, and the screen size of Person B's device. The backend 101 may then transmit, to the Person B's device, updated webpage view settings of the webpage 1212 to effect the same relative webpage view setting as the updated view settings of the webpage 1216 received from the first device as described above.

BBL 1202 determines the scroll X and Y positions on the webpage 1212 of Person B and settings of width and height of the webpage 1212, based on the webpage information or additional information of Person A, such as webpage width and height information of Person A, screen and browser information of Person A such as screen width and height of the device of Person A, Scroll X and Y of Person A and the screen and browser information of Person B, so that the contents displayed on the webpage 1212 of Person B are the same as those displayed for Person A. BBL 1202 may then, as illustrated in 1214, send the updated information to Person B's webpage 1212.

The webpage 1212 of Person B displays contents of the webpage 1218 based on updated scroll X and Y positions on the webpage 1212 with the URL and the screen and browser information of Person B (step 1312). In some examples, the device of Person B may run "scrollto( )" or "scrollby( )" method of JavaScript from the BL 104 to scroll the webpage 1212 to the position as appeared on Person A's webpage 1216. In some examples, the device of Person B may run "resizeTo( )" method of JavaScript from the BBL 1202 to resize the new window to the width and height of the webpage 1216 of Person A. In some examples, the device of Person B may run code to move the new window to the relative web browser window position on the screen (Window Screen Top, Window Screen Left) of Person A, when such information is received from the BBL 1202. In some examples, the system 100 may allow Person B to sign in to system 100 for screen sharing of the Person B. In some examples, Person B does not need to sign in for screen sharing, and merely accesses the webpage 1212 using the link.

In some examples, the webpage view settings of the webpage 1216 displayed on the Person A's device include a first position of the web browser window on the Person A's device. The webpage view settings of the webpage 1212 on the screen of Person B's device may include a second position of the web browser window on the Person B's device, to effect a same relative position on the Person B's device as the first position on the Person A's device. In some examples, the first position includes a first top position of the web browser window on the Person A's device and a first left position of the web browser window on the Person A's device. The second position may include a second top position of the second browser window and a second left position of the second web browser window on the Person B's device. In an example the "moveTo( )" or "moveTo( )" method of Javascript™ can be used to move the second browser window to the new position.

In some examples, when the Person A's device changes the first position of the web browser window that is displaying the webpage 1216 to an updated first position, the backend 101 receives the change and transmits code to the Person B's device to change the second position of the second web browser window displaying the webpage 1212 to an updated second position that is a same relative position to the screen width and height of the second device as the updated first position to the screen width and height of the first device of the first device.

In some examples, the BL 104 may use the inline frame function to prepare a webpage for Person B with the Person A's URL on a first party web domain hosted or controlled by the BL 104. The webpage is embedded in the First Party Domain, such as "musyfy.com/sender". The BL 104 sends the First Party Domain link to the front end of Person B. And the BL 104 notifies Person A that Person B has joined the Screen Share. Person B's front end may then loads the First Party webpage, such as "musyfy.com/sender". The BL 104 calculates the Scroll X and Scroll Y on the webpage based on the information provided by Person A and Person B. The BL 104 may updates the Scroll X and Scroll Y positions for the First Party webpage on the front end of Person B. First Party Webpage is updated with the new Scroll X and Y coordinates when Scroll X and Y coordinates on Person A's webpage change.

Each time when Person A scrolls the shared webpage 1216 (step 1314), the screen sharing application 111 repeats step 1312 on webpage 1212 of Person B, for example, by displaying on the screen of Person B the contents on the webpage 1212 based on current scroll X and Y positions on the webpage 1216 of Person A. As such, the webpage 1212 appears on Person B's screen reflects real time changes of the webpage 1216 on Person A's screen.

In some examples, when the Person A's device changes on the screen of Person A's device a current scroll X and Y position in the web browser window that is displaying the third-party webpage, the backend 101 receives the change and transmits code to the Person B's device to scroll the second web browser window displaying the third-party webpage to a same relative current scroll X and Y position.

In some examples, when the Person A's device changes a width and height of the web browser window that is displaying the third-party webpage, the backend 101 receives the change and transmits code to the Person B's device to change the web browser window displaying on the Person B's screen the third-party webpage to a same relative window width or window height of the first web browser window.

In some examples, the backend 101 is further configured for, when the Person A's device changes to a second third-party webpage 1216: receiving, from the front end 103 of the Person A's device, a web address of the second third-party webpage 1216; and sending code to the Person B's device webpage 1212 to display the second third-party webpage on the second web browser window with the second webpage view settings.

In some examples, when Person A changes the size of the webpage window, the Javascript™ codes of on the third part website, such as on the host server 1218, constantly refresh the webpage on Person B's device, for example at a predetermined frequency, such as every 2 seconds. In some examples, the shared webpage on Person B's device changes when scroll X and Y change on the webpage on Person A's screen.

In some examples, when the webpage 1216 on the Person A's device is changed to a second webpage in the web browser window of the Person A's device, the backend 101 is further configured to, subsequent to the detecting selection of the link by the Person B's device, receive, from the Person A's device, an address of the second webpage that is displayed on the web browser window of the Person A's device. The backend 101 may then transmit to the Person B's device code for displaying the second webpage in the web browser window with the second webpage view settings on the Person B's device. In some examples, the code further causes the Person B's device to output audibly the text or image of the third-party webpage 1212 on the Person B's device.

In some examples, when Person A starts browsing a new webpage, and if Person A would like to share the new webpage with Person B, the Person A may start process 1300 again.

In some other examples, after Person B clicks the link, Person B may be routed to a first party web domain hosted or controlled by the BL 104, such as "musyfy.com/sender", of which "musyfy.com" is an example first party web domain typically within or operated by the BL 104. The "/sender" is an extension of the domain name, and can be the name of Person A. The link can contain an address to the first party web domain. The webpage 121 is generated by the BL 104 and transmitted to Person B. The webpage 1212 mirrors the webpage 1216 Person A is viewing. The webpage 1212 has the contents from webpage 1210 hosted by host server 1218, and the webpage 1212 has the same window height and width as the webpage 1216 that Person A is browsing.

In some examples, the webpage 1212 on Person B may be a webpage 1212 generated by the BL 104 and inline framed to the webpage 1210 from third party host server 1218, so that the webpage 1210 can be displayed on the webpage 1212 of Person B. In other words, the part of the contents displayed from the webpage 1210, is inline framed using Hypertext Markup Language (HTML) "iframe" code and displayed on the webpage 1212 on the screen of Person B. In some other examples, the BL 104 caches the markup code (e.g. markup code containing text and images, such as HTML or XML) on the webpage 1210 and sends the markup code for display on the webpage 1212, to display a webpage 1212 on the screen of Person B. With the webpage 1212, Person B sees the same contents of the shared webpage 1216 from Person A. Commands or instructions are sent to the webpage 1212 of Person B so that the webpage 1212 has the same window height and width as the webpage 1216 that Person A is browsing.

In some examples, the BBL 1202 may retrieve from the host server 1218, via communication network 1205, information on the webpage 1210, including URL or webpage address, webpage width and height. In the example shown, the new webpage generated by the BL 104 has the URL: "musyfy.com/customer_name". The host server 1218 may be a third-party host server, wherein the third-party can be a retail e-commerce store.

In some examples, after Person B clicks the link, screen sharing application 111 may provide an indication to show that Person B is connected with and follows Person A. The indication may be a visual indication such as a button on front end 103 turns to green, or an audio indication generated by screen sharing application 111.

In some example, Person A and Person B may communicate with each other over voice via microphone during the webpage screen sharing process 1300. The BL 104 provides two-way audio communication between the devices of Person A and Person B.

In some example, during the webpage screen sharing process 1300, Person A and Person B may communicate with each other over live picture, video such as live video via cameras of Person A and B's devices, such as a Webcam of a computer or a camera of a mobile phone or a tablet. In some examples, live picture may include Picture in Picture during the screen sharing process. In an example, the Picture in Picture is an extension in the web browser application by way of a layer that is on top of the currently viewed webpage. In some examples, the profile pictures of the Person A and/or Person B may be displayed on the respective Person B and/or Person A's screens.

In some example, during the screen share process 1300, Person A and Person B may communicate with each other using voice via microphone as well as video via webcam or camera of Person A and Person B's devices.

During the webpage sharing process, Person A is connected with Person B by the system 100. For example, BL 104 communicates information between Person A and Person B. In some examples, when at least one of Person A and Person B leaves screen sharing application 111, such as by closing the shared webpage 1216 by Person A or closing the webpage 1212 on Person B's screen by Person B, the BBL 1202 terminates all of the connections, including audio or video communications, between the Person A and Person B. In some examples, the system 100 may notify one person, for example using message displayed on the person's screen, that the other person has left the screen sharing application 111. In some examples, the backend 101 is further configured for terminating, by the backend 101, any changes to webpage 1212 on the Person B's device when the webpage 1216 is closed on the Person A's device.

In some examples (not shown), Person A may pause web screen sharing by click a control button of screen sharing application 111. In this case, each time when Person A scrolls the shared webpage 1216, the screen sharing application 111 will not update the scroll position on webpage 1212 of Person B.

In some examples (not shown), screen sharing application 111 may allow Person A and Person B to swap web screen sharing roles of sender or leader and receiver or follower. In this case, Person B may share webpage screen of Person B with Person A using the process 1300 described herein.

In some examples, BL 104 may play a media file, which may be a music file, simultaneously on the two devices when the web screen is shared, the media file being selected based on an end customer of at least one or both of the two devices. As described herein, the backend 101 can be configured to play the music file on only one active window of those webpages (or web domains) that are registered with the BL 104.

In some examples, BL 104 may play visual images simultaneously on the first and second devices, such as an audio, and/or a video file or slideshow. In some examples, BL 104 may provide video communication between the first and second devices. In some examples, the media file and/or the visual images are customized and personalized to an end customer associated with the first device.

In some examples, BL 104 may provide vibration of the first device for confirmation for at least one of steps of method 1300 during the web screen sharing. In some examples, the first device may be a mobile device.

In some examples, BL 104 may play a personalized greeting on the first device or both devices during the web screen sharing.

In some examples, the backend 101 is configured for registering at least one website domain; wherein the front end 103 is embedded in each of at least one web browser window of the Person A's device, each web browser window associated with at least one of the website domains registered with the backend 101, each front end 103 including a media player, wherein the backend 101 is configured to generate a unique device identification (ID) for uniquely identifying the Person A's device, wherein the backend 101 is configured to direct the media player of only one web browser window of the at least one web browser window to play the media file.

In the following scenario, the Person B's browser height and width settings and web browse window position are not modified, but only the scroll X and Scroll Y are updated to follow the Person A's view settings.

In some examples, the code of Browser Screen Share Application 111 is embedded in the third party website. Person A visits the third party website. Person A signs in the Browser Screen Share Application 111. The following information is sent from the Person A Frontend to the Backend.
 a. Webpage domain address URL information,
 b. Page Width,
 c. Page Height,
 d. Screen Width,
 e. Screen Height,
 f. Window Screen Top,
 g. Window Screen Left,
 h. Browser Name
 i. Browser Settings,
 j. Browser Window Width,
 k. Browser Window Height,
 l. Scroll X,
 m. Scroll Y,
 n. Device information,
 o. Operating System information,
 p. IP address,
 q. Geo Coordinates, and
 r. Time are sent to the Backend with a timestamp.

This information is saved in the Database 106. From this point onwards, any changes to the information captured above is recorded with a timestamp. Person A can save items to the Wishlist for comparison and/or future buy. The Wishlist information is saved in the Backend database. Person A can add a new contact, if it's not there in the Contact List of the Browser Screen Share Application. Person A sends the invite, via a link, to the one or more Person B from the Contact list through email, phone message and/or Social Media Platform. By sending the invite, the Person A now becomes the Person A and the collected information in the information database is treated as Person A's information. The invite contains the link button and/or web page address to go to. Person B receives the invite. Person B clicks on the link from the invite, which opens a new tab of the browser or copy-paste the web address in the new tab of the Browser. The Person B's Screen Share Application communicates to the backend 101. The back end 101 authenticates the link from Person B. Once authenticated, the following information is sent from the Person B's Screen Share Application 111 from Person B's front end 103 to the back end 101.

a. Person B's Screen Width,
b. Person B's Screen Height,
c. Person B's Browser Name
d. Person B's Browser Settings,
e. Person B's Window Width,
f. Person B's Window Height,
g. Person B's Window Screen Top,
h. Person B's Window Screen Left,
i. Person B's device information,
j. Person B's Operating System information
k. Person B's IP address
l. Person B's Geo Coordinates and
m. Time stamp.

The back end 101 sends the last saved Person A's Web page domain URL information to the Person B's front end 103. And the back end 101 notifies the Person A that the Person B has joined the Screen Sharing. The Person B's front end 103 loads the Person A's URL Webpage and gets the Page width and Page Height information from the Hosting Server 1218. The back end 101 calculates the Scroll X and Scroll Y based on the information provided by the Person A and Person B. The back end 101 updates the Scroll X and Scroll Y position for the Person B's front end 103. Person B is taken to the new Scroll X and Y coordinates. At this point, Person B has the option to sign in to the Person B's Screen Share Application Front end 103.

In some examples, using, for example, iframe HTML code, the back end 101 prepares a First Party webpage with the Person A's URL webpage inline framed into the First Party Domain page (for example, musyfy.com/sender) for the Person B. The back end 101 sends the First Party Domain Address link to the Person B's front end 103. And the back end 101 notifies the Person A that the Person B has joined the Screen Share. The Person B's front end 103 loads the First Party Webpage (for example, musyfy.com/sender). The back end 101 calculates the Scroll X and Scroll Y based on the information provided by Person A and Person B. The back end 101 updates the Scroll X and Scroll Y position for the First Party Webpage on the Person B's front end 103. First Party Webpage is updated with the new Scroll X and Y coordinates.

In summary, the data may be collected during the screen sharing process are as follows:

| Data Collected By the Backend and from where | | |
|---|---|---|
| Person A Device | Person B Device | Third Party |
| a. Webpage domain address URL info OR Raster Image | | |
| b. Page Width, | | Page Width for Person As device Third Party URL |
| c. Page Height, | | Page Height for Person As device Third Party URL |
| d. Sender's Screen Width, | a. Receiver's Screen Width, | |
| e. Sender's Screen Height, | b. Receiver's Screen Height, | |
| f. Sender's Window Screen Top, | c. Receiver's Window Screen Top, | |
| g. Sender's Window Screen Left, | d. Receiver's Window Screen Left, | |
| h. Sender's Browser Name | e. Receiver's Browser Name | |
| i. Sender's Browser Settings, | f. Receiver's Browser Settings, | |
| j. Sender's Browser Window Width, | g. Receiver's Browser Window Width, | |
| k. Sender's Browser Window Height, | h. Receiver's Browser Window Height, | |
| l. Scroll X, | | |
| m. Scroll Y, | | |
| n. Device information, | i. Receiver's device information, | |
| o. Operating System information | j. Receiver's Operating System info | |
| p. IP address | k. Receiver's IP address | |
| q. Geo Coordinates and | l. Receiver's Geo Coordinates and | |
| r. Timestamp. | m. Time stamp. | |

In the some examples, the data transmitted from the backend 101 to the Person B's device may be summarized as follows:

| Data Transmitted from the Backend to the Person B's device | | | |
|---|---|---|---|
| | Third Party webpage embodiment | First Party webpage embodiment with Sender's URL Link ("musyfy.com/sender") | First Party with Sender's Raster Image |
| Mimics the Person As web address and scroll location on the page on Person's B Browser (FIG. 12(a)) | a. Webpage domain address URL info<br>b. Page Width,<br>c. Page Height,<br>d. Scroll X,<br>e. Scroll Y, | a. iframe version of the URL<br>b. iframe version of the Page Width<br>c. iframe version of Page Height<br>d. iframe version of Scroll X<br>e. iframe version of Scroll Y | a. iframe version of the Raster Image |
| Mimics the size, position, and scroll location of the Person As Browser on Person B's Screen (FIG. 12(b)) | d. Sender's Window Screen Top,<br>e. Sender's Window Screen Left,<br>g. Sender's Window Width,<br>h. Sender's Window Height, | f. Sender's Window Screen Top,<br>g. Sender's Window Screen Left,<br>h. Sender's Window Width,<br>i. Sender's Window Height, | b. Sender's Window Screen Top,<br>c. Sender's Window Screen Left,<br>d. Sender's Window Width,<br>e. Sender's Window Height, |

Therefore, screen sharing application 111 allows a Person A to share webpage with Person B by only sharing the selected information with Person B, such as the URL or web address, screen settings, webpage view settings, browser settings and Scroll X and Y position of Person A's device and screen settings and Browser settings of Person B.

Figure 16:
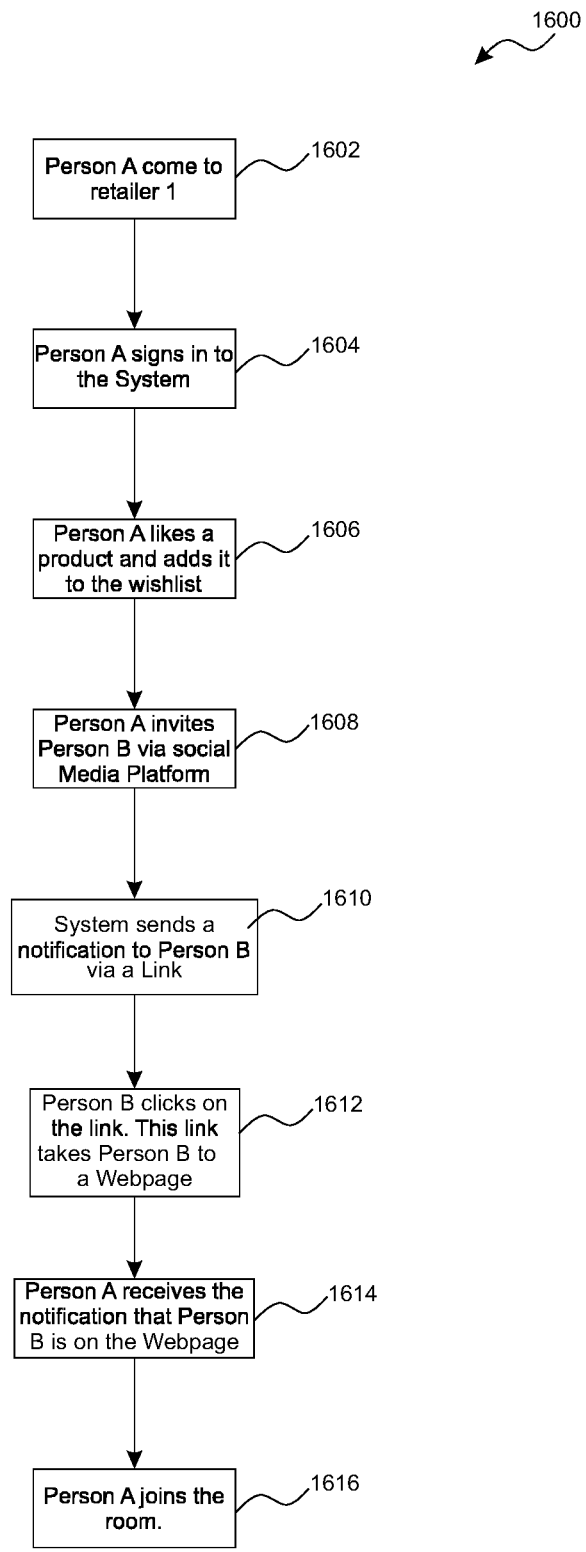
FIG. 16 is a flow chart showing an exemplary process using the system of FIG. 1 for social shopping.

Secure social online shopping will now be described, in accordance with example embodiments. FIG. 16 is a flow chart showing an exemplary process 1600 of online shopping using the system 100. In FIG. 16, person A first visits a website of an online business, such as a retailer (step 1602). The website is embedded with a front end 103 of system 100. The front end 103 may contain a media player button, a microphone button, and a social shopping button. In some examples, after the media player button is clicked the front end 103 may display the information of the media file, such as the genre of the song.

Person A then signs in system 100 via the front end 103 (step 1604). With the signing in of Person A, in some examples, person A is signed in to the different personal social media platforms. Person A browses the products on the website of the online business while a media file starts playing. If Person A likes a product and, he or she adds it to the wish list (step 1606). In some examples, BBL 1202 may save the Person A's wishlist in the DL 1204, such as in database 106. Each product on the wish list may link to the webpage of the specific webpage of the online business.

As illustrated in the example of FIG. 14, after the social shopping button is clicked, an interface containing a favorites tab and a Wishlist tab is displayed. If the favorites tab is selected, an exemplary list of favorite contacts for person A to contact may be displayed on the front end 103. The status of the microphone may be switched among "Off", "On", and "Mute" when the microphone button is clicked. If the microphone is on the "ON" status, person A may speak with other persons listed on the favorite contacts from the front end 103. As illustrated in the example of FIG. 15, after the social shopping button is clicked and the Wishlist tab is selected, an exemplary list of products, such as shoes, jewelry, hand bags, etc., or web pages that have been added previously in the Wishlist, for example in a tabular format.

Person A may initiate a social shopping, for example by clicking a social shopping button 190 in FIG. 15, and then invites Person B via phone text message, a social media platform (step 1608), for example, Facebook™, WhatsApp™, Windows Live Messenger™, Skype™, Google Plus™, etc. Person A sends an invitation or notification to Person B (step 1610). For example, the invitation can be in the form of a web link such as "www.musyfy.com/sender", of which "musyfy.com" is an example first party web domain of the BL 104. Front end 103 sends the invitation to the account of Person B in the selected social media platform, such as WhatsApp™, Facebook™, Windows Live Messenger™, Skype™, Google Plus™, etc. In some examples, when Person A signs into the front end 103 of system 100, Person A is signed into one or more various Social Media platforms that are associated with Person A. Person B clicks on the invitation which directs Person B to the designated webpage, such as the webpage associate with the web link www.musyfy.com/meetme/personA (step 1612). In some example, the social media platform is used to communicate other modalities for the Person B to further communicate with Person A. For example, Person A may send to Person B, via social media platform, a phone number, or a web link in an email, or a tweet message using Twitter™ for Person B to reach the designated webpage having the web screen share session initiated by Person A. In other examples, the BL 104 sends the invitation or notification to Person B.

The invitation or notification provides a link to the designated webpage. The designated webpage functions as a virtual meeting room. After Person B is on the designed webpage, person A receives a notification from BL 104 that Person B is on the designated webpage of BL 104 (step 1614). Person A may visit the designated webpage or virtual meeting room, with the shared screen by virtue of the same designated webpage, to further communicate with Person B (step 1616). In some examples, at least one speaker and a microphone are available for each of person A and Person B, who may speak to each other remotely regarding the wish list items. As such, BL 104 allows person A to have two-way audio connectivity by talking with Person B and visual connectivity by viewing the same contents on the designated webpage. The front end 103 of system 100 is embedded in the designated webpage. In the process 1200, Person B may represent one or more people.

In some examples, the webcam of the computer or camera of the mobile phone/Tablet device is available for each of Person A and Person B, who may also see each other remotely regarding the wish list items. As such, BL 104 allows Person A and Person B to have two-way visual connectivity by showing each others image on top of the designated webpage, for example as a Picture in Picture (PIP) form. The front end 103 of system 100 is embedded in the designated webpage. Person B may represent one or more people. In some examples, the backend 101 is configured to provide video communication, by way of picture-in-picture embedded in the displayed third party webpage 1216 of the web browser window on the Person A's device, and the web browser window and the front end, between the Person A's device and the Person B's device.

In some examples, the BL 104 may present audibly the text or image of the webpage on the first device, or a product review section or a predefined section of the designated webpage on the first device. For example, text-to-speech or an image recognition algorithm that can identify and audio describe an image can be used. In some examples, the BL 104 may output audibly local deals, giveaways, store sales, and/or current deals on the first device.

Therefore, by allowing end customer to bring in others, such as Person B, in the shopping process, process 1200 creates a bi-directional shopping chat experience, and thus improves and enhances customer experience for online customers by making the shopping experience social and by including additional senses in addition to the vision (visual sense), such as providing voice communication by using microphone and speaker between two remote persons.

Figure 13:
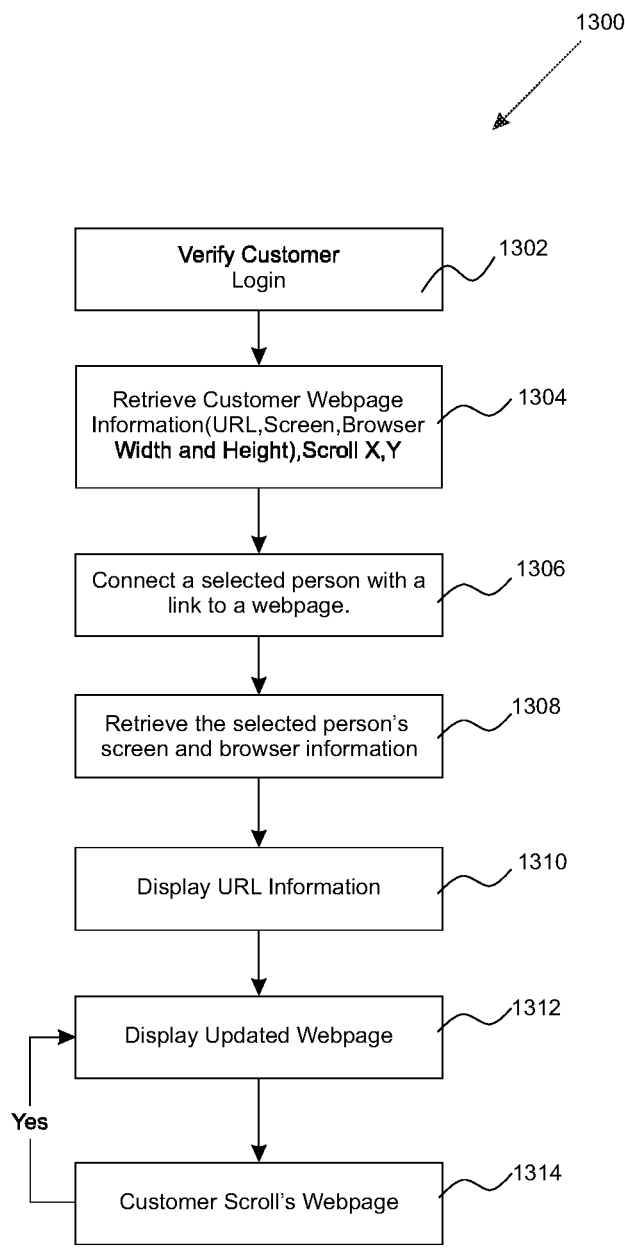
FIG. 13 is a flow chart showing an exemplary web screen sharing process of the system in FIGS. 12(*a*) and 12(*b*)

Sometimes, an end customer can be frustrated if the end customer cannot find a product. In some examples, an online business can have a representative who logs into their own device in the front end 103 in order to have a verbal chat with an online customer; e.g., answer the queries of the online customer, by using for example the front end 103 in FIG. 14 or 15. For example, With the front end 103 illustrated in FIG. 12 or 13 also allows two or more persons to have audio communications by logging into a designated webpage incorporated in front end 103, such as an additional button designated as discussion area. For example, one or more end customers may have one or more clerks of the online business. On the designated webpage, at least one speaker and a microphone are available for each of the end customers and one or more clerks. The online business representative can view the same webpage currently viewed by the online customer, and vice versa.

Figure 17:
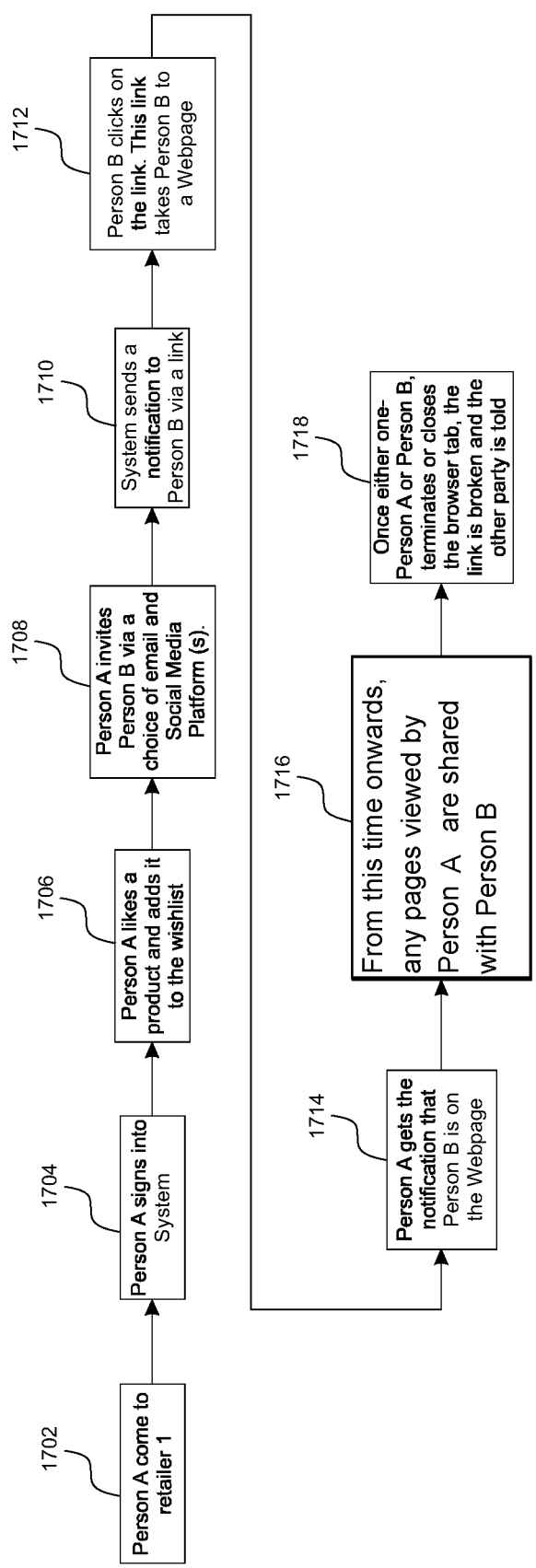
FIG. 17 is a flow chart showing another exemplary process using the screen sharing system of FIG. 14 for social shopping. Similar reference numerals may have been used in different figures to denote similar components.

FIG. 17 is a flow chart showing another exemplary process 1700 of online shopping using the system 100 with screen sharing application 111. In FIG. 17, person A first visits a website of an online business, such as retailer 1 (step

1702). The website is embedded with a front end 103 of system 100. The front end 103 may contain a screen sharing application 111. In some examples, the front end 103 may also contain a media player button, a microphone button, and a social shopping button.

Person A then signs in system 100 via the front end 103 (step 1704). As such, Person A has access to the screen sharing application 111. With the signing in of Person A, in some examples, person A is signed in to the different personal social media platforms. Person A browses the products on the website of the online business while a media file starts playing. If person A likes a product and, he or she adds it to the wish list (step 1706). Each product on the wish list may link to the webpage of the specific webpage of the online business. Person A may initiate a social shopping, for example by clicking a social shopping button 190 in FIG. 15, and invite Person B shopping together, for example, via an email or a social media platform such as Facebook™ (step 1708). Front end 103 sends an invitation or notification to Person B, for example, in the form of a web link such as "www.musyfy.com/sender" (step 1710). Front end 103 sends the invitation to the email of Person B or the account of Person B in the selected social medial platform, such as WhatsApp™, Facebook™, Windows Live Messenger™, Skype™, Google Plus™, etc. In some examples, when Person A signs into the Front end 103 of system 100, Person A is signed into the various Social Media platforms that associated with Person A. Person B clicks on the invitation which directs Person B to the designated webpage, such as the webpage "www.musyfy.com/sender" (step 1712). In some example, the social medial platform is used as communicate means for the Person B to further communicate with Person A. For example, Person A may send to Person B, via social media platform, a phone No., or a web link in an email, or a tweeter message to reach Person A, The designated webpage functions as a virtual meeting room. After Person B is on the designed webpage, person A receives a notification from BL 104 that Person B has joined and is on the designated webpage of BL 104 (step 1714). At step 1716, in some examples, any pages viewed by person A are shared with Person B using the screen sharing application 111 described in process 1300 and the web link "www.musyfy.com/sender" is also used in screen sharing step 1306. In this case, Person A only shares selected webpage with Person B using the process 1300 described above.

Person A may visit the designated webpage or virtual meeting room, with the shared screen by virtue of the same designated webpage, to further communicate with Person B (step 1716). The link is broken if either Person A or Person B terminates or closes the web browser window. In some examples a message may be displayed or output to one person that the other person has terminated the session.

In some examples, at least one speaker and a microphone are available for each of Person A and Person B in both processes 1600 and 1700, who may speak to each other remotely regarding the wish list and shop together. As such, BL 104 allows person A to have audio experience by talking with Person B and visual experience by viewing the contents on the designated webpage. In the processes 1600 and 1700, Person B may represent one or more people.

In some examples, the webcam of the computer or camera of the mobile phone/Tablet device is available for each of Person A and Person B, who may also see each other remotely regarding the wish list items. As such, BL 104 allows Person A and Person B to have two-way visual connectivity by showing each others image on top of the designated webpage, for example as a Picture in Picture (PIP) form. The front end 103 of system 100 is embedded in the designated webpage. Person B may represent one or more people.

In some examples, once Person A or Person B leaves the social shopping in process 1700, for example, by terminating or closing their web browser window (or the web browser program), the BL 104 terminates the connections between Person A and Person B (step 1718). The visual indication of the web screen sharing connection may be turned off to signal to Person A.

In some examples, front end 103 may include applications that convert the displayed text on a webpage to voice to assist the visually impaired individuals. This can be achieved automatically once the webpage is opened or an end customer highlights the text. Front end 103 embedded in the webpage may then deliver the content of the text in audio form. This would improve the end customer experience for the visually challenged end customers by offering the information in auditory format from the webpage.

In some examples, product information may be provided by the online business, or the Artificial Intelligence image recognition, text to speech software may be used to obtain product attributes on the webpage and delivered to the end customer audibly through system 100.

In some examples, in addition to playing music, review etc., front end 103 may capture the verbal comments from the end customers and thus improves communication between the online business and end customers. When end customers would like to be heard verbally, front end 103 enables recording of the end customers' voice by associating the voice to the Device ID associated with the end customer and saving the voice in database 106.

In some examples, BL 104 may provide personalized and customized media and images to an end customer. For example, based on the registered profile of the end customer saved in database 106, BL 104 determines a proper type of media, such as music, for the person.

In some examples, by simulating different portions of the brain of a person with different senses simultaneously, such as audio and visual stimulation system 100 may help alleviate degradation of memory and sometimes help rebuild in neuron connections. Music is known to help rebuild neuron connections in the brain. Audio stimulation from Music along with the visual stimulation from familiar images creates neuro plasticity. By playing media, such as music, along with the visual stimulation according to the patient's preference, system 100 may help alleviates the degradation of memory and may help rebuild in neuron connections, which leads to Alzheimer's. The visual simulation includes images familiar to the patient, for example, family photographs of the patient and any trips photographs from historical locations where the person has been, etc.

As well, system 100 may serve as a product promotional platform, which offers another touch point for an end customers with the sound and enables retailers' ability to touch the end customer in a personal way with a second sense. Specifically, in addition to the media, such as music, BL 104 can obtain the local deals, Giveaways, Store Sales, Current deals etc. and delivers to an end customer audibly as if the end customer is talking to a sales associate. As well, BL 104 can personalize deals based on previous searches like the airlines industry does. For repeat customers, BL 104 can offer special discounts to seal the deal. Finally, an end customer may choose to listen to or watch an advertisement delivered by system 100, and in exchange, the end customer receives a shopping credit from the retailer.

In some examples, system 100 may serve as a product reviewer or customer experience platform. In particular, front end 103 may obtain the product reviews or predefined sections of the page. For example, for home sales/real estate website, front end 103 can obtain the home sizes and room attributes, which are shown below in the small text. Presently, customers look for product/service reviews on a separate browser window. This takes them away from the retailers' store. By curating the reviews using the Artificial Intelligence Text to speech application at customers' choice/request, front end 103 may provide product reviews using sound through the same browser window. Customer can click on the product and hear the reviews while continuing to browse through item features.

In some examples, front end 103 may be used to relay local information like the weather, and to obtain the podcast, speeches, stories, news, funny news stories, books, and jokes, etc. In some examples, such as at restaurants, front end 103 may be used to obtain the Menu to the patrons. Sometimes, the lighting in some restaurants may be dim, or patrons do not have their glasses.

In some examples, in addition to the visual and sound, system 100 may include another dimension to the multi-sensory experience for end customers using mobile devices—tactile. The tactile sense can be added by the vibration of the phone for confirmation/validation of the various actions like "Buy", "Added to Cart," etc. By using the Speech to Text application or interfacing with the client, system 100 may promote the treatment of certain online activities. In this example, "Buy confirmation" can be treated with a vibration in the mobile device. Using tactile sense (vibration) with or without audio and visual sense in the mobile devices may attract online end customer's attention and convert to the sale.

In accordance with an example embodiment, there is provided a non-transitory computer-readable medium containing instructions executable by a processor for performing any one of or all of the described methods. In accordance with an example embodiment, there is provided a processor-implemented method for performing any one of or all of the described functions described with respect to any of the processors.

In accordance with an example embodiment, there is provided a system for playing a media file, comprising: a backend configured for registering at least one website domain; a front end embedded in each of at least one web browser window of a device, each web browser window associated with at least one of the website domains registered with the backend, each front end including a media player, the backend configured to generate a unique device identification (ID) for uniquely identifying the device, wherein the backend is configured to direct the media player of only one web browser window of the at least one web browser window to play the media file.

In accordance with any one of the preceding example embodiments, the only one web browser window is an active web browser window, wherein the media player plays the media file seamlessly and continuously on the active web browser window irrespective of which of the at least one web browser window is the active web browser window.

In accordance with any one of the preceding example embodiments, the media file is provided to the only one web browser window from a media server.

In accordance with any one of the preceding example embodiments, the media server is a third-party media server.

In accordance with any one of the preceding example embodiments, the backend is configured to generate at least one media link to the media server, and transmit the at least one media link to one the front ends, wherein that front end is configured to retrieve at least one media file for playing on the media player of that front end by accessing at least one of the media links.

In accordance with any one of the preceding example embodiments, each of the at least one web domain are third party web domains to the backend.

In accordance with any one of the preceding example embodiments, at least two different website domains are registered with the backend, and wherein the at least one web browser window comprises at least two web browser windows from the at least two different website domains.

In accordance with any one of the preceding example embodiments, each front end is further configured for collecting, storing, recording, or sending information associated with that front end to the backend.

In accordance with any one of the preceding example embodiments, the device ID is generated by the backend from an image of browser settings of a web browser used to display the at least one web browser window.

In accordance with any one of the preceding example embodiments, the image of browser settings comprises a browser fingerprint of the web browser of the device.

In accordance with any one of the preceding example embodiments, the device ID is generated by the backend using User Agent data of the device.

In accordance with any one of the preceding example embodiments, the device ID is generated by the backend from a combination of image of browser settings of the web browser of the device, User Agent data of the device, and an IP address of the device.

In accordance with any one of the preceding example embodiments, the Device ID is generated without user login or user registration with the backend.

In accordance with any one of the preceding example embodiments, the at least one web browser window comprises a first web browser window and a second web browser window, wherein when the first web browser window is an active web browser and the active web browser switches to the second web browser window, the media player in the front end of the first web browser window stops playing the media file and the media player in the front end of the second web browser window starts playing the media file from a stop point of the media file In accordance with any one of the preceding example embodiments, the media file is a music file.

In accordance with any one of the preceding example embodiments, the backend is configured to select the media file based on current contents of one or more of the web browser windows.

In accordance with any one of the preceding example embodiments, the current contents are one or more images or one or more texts.

In accordance with any one of the preceding example embodiments, the current contents includes a product or service of one or more of the web browser windows that can be purchased from the respective web domain, wherein the web domain is an electronic commerce web domain.

In accordance with any one of the preceding example embodiments, the one web browser window to play the media file is an active web browser window.

In accordance with any one of the preceding example embodiments, the backend is configured to select the media file based on a user profile associated with the Device ID, the user profile generated at least based on past contents and/or current contents of one or more web browser windows used by an end customer associated with the user profile.

In accordance with any one of the preceding example embodiments, the Device ID is generated by a combination of a browser fingerprint, User Agent data and a router IP address.

In accordance with an example embodiment, there is provided a system for uniquely identifying a device, comprising: a backend; a front end embedded in a web browser window of the device, the backend configured to generate a unique device identification (ID) for uniquely identifying the device, the device ID generated by the backend from a combination of image of browser settings of the web browser of the device, User Agent data of the device, and an IP address of the device, the backend configured to receive a communication from the front end, verify the device ID from the communication and send, when there is successful verification of the device ID, a second communication to the device through the front end.

In accordance with an example embodiment, there is provided a system for web screen sharing between a first device and a second device, the system comprising: a backend configured for: receiving, from a front end within a first web browser application of the first device that is displaying a third-party webpage in a first web browser window, screen width and height of the first device, wherein the third-party webpage is from a third-party host server; receiving, from the front end, an address of the third-party webpage; receiving, from the front end, first webpage view settings of the first web browser window that is displaying the third-party webpage, the first webpage view settings comprising width and height of the first web browser window that is displaying the third-party webpage, and first scroll X and Y positions of the first web browser window that is displaying the third-party webpage; receiving, from the third party host server, the web page width and height of the third party webpage; generating a link that addresses the backend; sending the link to the second device; and in response to detecting selection of the link by the second device: receiving, from the second device, second screen width and height of the second device, and width and height of the second web browser window, and transmitting, to the second device, code for displaying of the third-party webpage on a second web browser window of the second device, and second webpage view settings, comprising second scroll X and Y positions of the second web browser window, for displaying of the third-party webpage on the second web browser window of the second device to effect a same relative webpage view setting as the first webpage view settings of the first web browser window that is displaying the third-party webpage on the first device.

In accordance with any one of the preceding example embodiments, the second webpage view settings transmitted to the second device comprises second width and height of the second web browser window.

In accordance with any one of the preceding example embodiments, the same relative webpage view setting is determined by the backend by calculating a proportion of the width and height of the first web browser window to the screen width and height of the first device, and determining a same proportion of the second width and height of the second web browser window to the second screen width and height of the second device.

In accordance with any one of the preceding example embodiments, the receiving, from the front end, of the first webpage view settings, is performed subsequent to the detecting selection of the link by the second device.

In accordance with any one of the preceding example embodiments, the receiving, from the front end, of the first webpage view settings, is performed previous to the detecting selection of the link by the second device.

In accordance with any one of the preceding example embodiments, when the first webpage view settings of the first web browser window that is displaying the third-party webpage third-party are changed in the first device, the backend is further configured to receive, from the front end, subsequent to the detecting selection of the link by the second device, updated first webpage view settings of the third-party webpage displayed on the first device; and transmit, to the second device, updated second webpage view settings to effect the same relative webpage view setting as the updated first webpage view settings received from the front end of the first device.

In accordance with any one of the preceding example embodiments, when the third-party webpage is changed to a second third-party webpage in the first web browser window of the first device, the backend is further configured to receive, from the front end, an address of the second third-party webpage that is displayed on the first web browser window of the first device and first webpage view settings of the first web browser window that is displaying the second third-party webpage; and transmit to the second device code for displaying the second third-party webpage in the second web browser window with the second webpage view settings.

In accordance with any one of the preceding example embodiments, the first webpage view settings of the third-party webpage displayed on the first device comprise a first position of the first web browser window, wherein the second webpage view settings comprise a second position of the second web browser window, to effect a same relative position on the second device as the first position on the first device.

In accordance with any one of the preceding example embodiments, the first position comprises a first top position of the first web browser window and a first left position of the first web browser window, wherein the second position comprises a second top position of the second browser window and a second left position of the second web browser window.

In accordance with any one of the preceding example embodiments, when the first device changes the first position of the first web browser window that is displaying the third-party webpage to an updated first position, the backend receives the change and transmits code to the second device to change the second position of the second web browser window displaying the third-party webpage to an updated second position that is a same relative position to the second screen width and height of the second device as the updated first position to the screen width and height of the first device.

In accordance with any one of the preceding example embodiments, the link is sent to the second device using at least one of an email or a text message via a phone and/or social media platform.

In accordance with any one of the preceding example embodiments, the backend is further configured for receiving, from the front end, additional information comprising at least one of: browser name and browser settings on the first device, IP address, operation system of the first device, models of the Central Processing Unit (CPU) or Graphics Processing Unit (GPU) of the first device, geographical coordinates, or local time of the first device; and wherein the backend is further configured for uniquely identifying the first device based on at least one of the additional information.

In accordance with any one of the preceding example embodiments, the backend is further configured for receiving, from the second device, additional information comprising at least one of: browser name and browser settings on the second device, IP address, operation system of the second device, models of the Central Processing Unit (CPU) or Graphics Processing Unit (GPU) of the second device, geographical coordinates, or local time of the second device; and wherein the backend is further configured for uniquely identifying the second device based on at least one of the additional information of the second device to uniquely identify the second device.

In accordance with any one of the preceding example embodiments, the backend is further configured for: generating, using an inline frame function, a first party webpage with the third-party webpage from the third-party host server inline framed within the first party webpage; wherein the link include an address to the first party webpage; and wherein the code that is transmitted from the backend to the second device includes the first party webpage, for the displaying of the third-party webpage, inline framed within the first party webpage and having the second scroll X and Y positions, on the second web browser window of the second device.

In accordance with any one of the preceding example embodiments, the backend is further configured for: generating a first party webpage including the third-party webpage rasterized as an image within the first party webpage; wherein the code that is transmitted from the backend to the second device includes the first party webpage, for the displaying of the third-party webpage on the second web browser window of the second device.

In accordance with any one of the preceding example embodiments, the code that is transmitted from the backend to the second device comprises an address of the third-party host server for the second device to retrieve the third-party webpage from the third-party host server, for the displaying of the third-party webpage on the second web browser window of the second device.

In accordance with any one of the preceding example embodiments, when the first device changes a current scroll X and Y position in the first web browser window that is displaying the third-party webpage, the backend receives the change and transmits code to the second device to scroll the second web browser window displaying the third-party webpage to a same relative current scroll X and Y position.

In accordance with any one of the preceding example embodiments, when the first device changes the width and height of the first web browser window that is displaying the third-party webpage, the backend receives the change and transmits code to the second device to change the second web browser window displaying the third-party webpage to a same relative window width and height of the width and height of the of the first web browser window.

In accordance with any one of the preceding example embodiments, the backend is further configured to, when the first device changes to a second third-party webpage: receive, from the front end, a web address of the second third-party webpage and further first webpage view settings of the first web browser displaying the second third party webpage; and send code to the second device webpage to display the second third-party webpage on the second web browser window with further second webpage view settings to effect a same relative webpage view setting as the further first webpage view settings.

In accordance with any one of the preceding example embodiments, the backend is configured to transmit a message to the front end that the link was selected by the second device, for the front end to output an indication on the first device to show that the second device is web screen sharing the web browser window of the first device.

In accordance with any one of the preceding example embodiments, the backend is configured to provide audio and/or video communication, through the second device webpage and the front end, between the first device and the second device.

In accordance with any one of the preceding example embodiments, the backend is configured to terminate the audio or video communication between the first device and the second device when the first web browser window is closed on the first device or the second web browser window is closed on the second device.

In accordance with any one of the preceding example embodiments, the backend is configured to provide video communication, by way of picture-in-picture within the first web browser window and the second web browser window, between the first device and the second device.

In accordance with any one of the preceding example embodiments, the backend is further configured for terminating, by the backend, any changes to the second device webpage on the second device when the first web browser window is closed on the first device.

In accordance with any one of the preceding example embodiments, the backend is further configured for playing a media file simultaneously on the first device and the second device when web screen sharing is being performed, the media file being selected based on an end customer of at least one or both of the two devices.

In accordance with any one of the preceding example embodiments, the media file is a music file.

In accordance with any one of the preceding example embodiments, the backend is further configured to display additional visual images simultaneously on the first device and the second device.

In accordance with any one of the preceding example embodiments, the visual images are customized and personalized to an end customer associated with the first device.

In accordance with any one of the preceding example embodiments, the code further causes the second device to output audibly the text or image of the third-party webpage on the second device.

In accordance with any one of the preceding example embodiments, the backend is configured for registering at least one website domain; wherein the front end is embedded in each of at least one web browser window of the first device, each web browser window associated with at least one of the website domains registered with the backend, each front end including a media player, wherein the backend is configured to generate a unique device identification (ID) for uniquely identifying the first device, wherein the backend is configured to direct the media player of only one web browser window of the at least one web browser window to play the media file.

In accordance with any one of the preceding example embodiments, the only one web browser window to play the media file is an active web browser window.

In accordance with any one of the preceding example embodiments, further comprising the front end of the first device.

In accordance with any one of the preceding example embodiments, the front end within the first web browser application is embedded in the third-party webpage or is a browser extension of the first web browser application.

In accordance with any one of the preceding example embodiments, a second front end is provided within the second web browser application for the displaying of the third-party webpage on the second web browser window of the second device, wherein the second front end is embedded in the third-party webpage or embedded in a first party webpage generated by the backend or is a browser extension of the second web browser application.

In accordance with any one of the preceding example embodiments, the second scroll X and Y positions are calculated by the backend from the width and height of the first web browser window, the first scroll X and Y positions of the first web browser window, the web page width and height of the third party webpage, the second screen width and height of the second device, and the second width and height of the second web browser window.

In accordance with any one of the preceding example embodiments, the third-party webpage of the first web browser window displays a good or service to be purchased, wherein the third-party webpage displayed on the second web browser window of the second device displays the good or service to be purchased.

In the described methods, the boxes may represent events, steps, functions, processes, modules, state-based operations, etc. While some of the above examples have been described as occurring in a particular order, it will be appreciated by persons skilled in the art that some of the steps or processes may be performed in a different order provided that the result of the changed order of any given step will not prevent or impair the occurrence of subsequent steps. Furthermore, some of the messages or steps described above may be removed or combined in other embodiments, and some of the messages or steps described above may be separated into a number of sub-messages or sub-steps in other embodiments. Even further, some or all of the steps may be repeated, as necessary. Elements described as methods or steps similarly apply to systems or subcomponents, and vice-versa. Reference to such words as "sending" or "receiving" could be interchanged depending on the perspective of the particular device.

While some example embodiments have been described, at least in part, in terms of methods, a person of ordinary skill in the art will understand that some example embodiments are also directed to the various components for performing at least some of the aspects and features of the described processes, be it by way of hardware components, software or any combination of the two, or in any other manner. Moreover, some example embodiments are also directed to a pre-recorded storage device or other similar computer-readable medium including program instructions stored thereon for performing the processes described herein. The computer-readable medium includes any non-transient storage medium, such as RAM, ROM, flash memory, compact discs, USB sticks, DVDs, HD-DVDs, or any other such computer-readable memory devices.

It will be understood that the devices described herein include one or more processors and associated memory. The memory may include one or more application program, modules, or other programming constructs containing computer-executable instructions that, when executed by the one or more processors, implement the methods or processes described herein.

The various embodiments presented above are merely examples and are in no way meant to limit the scope of this disclosure. Variations of the innovations described herein will be apparent to persons of ordinary skill in the art, such variations being within the intended scope of the present disclosure. In particular, features from one or more of the above-described embodiments may be selected to create alternative embodiments comprises of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover all suitable changes in technology.

Certain adaptations and modifications of the described embodiments can be made. Therefore, the above discussed embodiments are considered to be illustrative and not restrictive.

What is claimed is:

1. A system for web screen sharing between a first device and a second device, the system comprising:
a backend configured for:
receiving, from a front end within a first web browser application of the first device that is displaying a third-party webpage in a first web browser window, screen width and height of the first device, wherein the third-party webpage is from a third-party host server;
receiving, from the front end, an address of the third-party webpage;
receiving, from the front end, first webpage view settings of the first web browser window that is displaying the third-party webpage, the first webpage view settings comprising width and height of the first web browser window that is displaying the third-party webpage, and first scroll X and Y positions of the first web browser window that is displaying the third-party webpage;
receiving, from the third party host server, the web page width and height of the third party webpage;
generating, at the backend, a link that addresses the backend;
sending, from the backend, the link to the second device; and
in response to detecting selection of the link by the second device:
receiving, from the second device, second screen width and height of the second device, and width and height of the second web browser window, and
transmitting, to the second device, code for displaying of the third-party webpage on a second web browser window of the second device, in which the second device retrieves the third-party webpage from the third-party host server, and second webpage view settings, comprising second scroll X and Y positions of the second web browser window, for displaying of the third-party webpage on the second web browser window of the second device to effect a same relative webpage view setting as the first webpage view settings of the first web browser window that is displaying the third-party webpage on the first device, providing, by the backend, audio and/or video communication through the second web browser window and the front end of the second device, between the first device and the second device.

2. The system of claim 1, wherein the second webpage view settings transmitted to the second device comprises second width and height of the second web browser window.

3. The system of claim 2, wherein the same relative webpage view setting is determined by the backend by calculating a proportion of the width and height of the first web browser window to the screen width and height of the first device, and determining a same proportion of the second width and height of the second web browser window to the second screen width and height of the second device.

4. The system of claim 1, wherein the receiving, from the front end, of the first webpage view settings, is performed subsequent to the detecting selection of the link by the second device.

5. The system of claim 1, wherein the receiving, from the front end, of the first webpage view settings, is performed previous to the detecting selection of the link by the second device.

6. The system of claim 1, wherein when the first webpage view settings of the first web browser window that is displaying the third-party webpage third-party are changed in the first device, the backend is further configured to receive, from the front end, subsequent to the detecting selection of the link by the second device, updated first webpage view settings of the third-party webpage displayed on the first device; and transmit, to the second device, updated second webpage view settings to effect the same relative webpage view setting as the updated first webpage view settings received from the front end of the first device.

7. The system of claim 1, wherein when the third-party webpage is changed to a second third-party webpage in the first web browser window of the first device, the backend is further configured to receive, from the front end, an address of the second third-party webpage that is displayed on the first web browser window of the first device and first webpage view settings of the first web browser window that is displaying the second third-party webpage; and transmit to the second device code for displaying the second third-party webpage in the second web browser window with the second webpage view settings.

8. The system of claim 1, wherein the first webpage view settings of the third-party webpage displayed on the first device comprise a first position of the first web browser window, wherein the second webpage view settings comprise a second position of the second web browser window, to effect a same relative position on the second device as the first position on the first device.

9. The system of claim 8, wherein when the first device changes the first position of the first web browser window that is displaying the third-party webpage to an updated first position, the backend receives the change and transmits code to the second device to change the second position of the second web browser window displaying the third-party webpage to an updated second position that is a same relative position to the second screen width and height of the second device as the updated first position to the screen width and height of the first device.

10. The system of claim 1, wherein the link is sent to the second device using at least one of an email or a text message via a phone and/or social media platform.

11. The system of claim 1, wherein the backend is further configured for receiving, from the front end, additional information comprising at least one of: browser name and browser settings on the first device, IP address, operation system of the first device, models of the Central Processing Unit (CPU) or Graphics Processing Unit (GPU) of the first device, geographical coordinates, or local time of the first device; and wherein the backend is further configured for uniquely identifying the first device based on at least one of the additional information.

12. The system of claim 1, wherein the backend is further configured for receiving, from the second device, additional information comprising at least one of: browser name and browser settings on the second device, IP address, operation system of the second device, models of the Central Processing Unit (CPU) or Graphics Processing Unit (GPU) of the second device, geographical coordinates, or local time of the second device; and wherein the backend is further configured for uniquely identifying the second device based on at least one of the additional information of the second device to uniquely identify the second device.

13. The system of claim 1, wherein the backend is further configured for:

generating, using an inline frame function, a first party webpage with the third-party webpage from the third-party host server inline framed within the first party webpage;

wherein the link include an address to the first party webpage; and wherein the code that is transmitted from the backend to the second device includes the first party webpage, for the displaying of the third-party webpage, inline framed within the first party webpage and having the second scroll X and Y positions, on the second web browser window of the second device.

14. The system of claim 1, wherein the backend is further configured for:

generating a first party webpage including the third-party webpage rasterized as an image within the first party webpage;

wherein the code that is transmitted from the backend to the second device includes the first party webpage, for the displaying of the third-party webpage on the second web browser window of the second device.

15. The system of claim 1, wherein the code that is transmitted from the backend to the second device comprises an address of the third-party host server for the second device to retrieve the third-party webpage from the third-party host server, for the displaying of the third-party webpage on the second web browser window of the second device.

16. The system of claim 1, wherein when the first device changes a current scroll X and Y position in the first web browser window that is displaying the third-party webpage, the backend receives the change and transmits code to the second device to scroll the second web browser window displaying the third-party webpage to a same relative current scroll X and Y position.

17. The system of claim 1, wherein when the first device changes the width and height of the first web browser window that is displaying the third-party webpage, the backend receives the change and transmits code to the second device to change the second web browser window displaying the third-party webpage to a same relative window width and height of the width and height of the of the first web browser window.

18. The system of claim 1, wherein the backend is further configured to, when the first device changes to a second third-party webpage:
  receive, from the front end, a web address of the second third-party webpage and further first webpage view settings of the first web browser displaying the second third party webpage; and
  send code to the second device webpage to display the second third-party webpage on the second web browser window with further second webpage view settings to effect a same relative webpage view setting as the further first webpage view settings.

19. The system of claim 1 wherein the providing the audio and/or video communication between the first device and the second device is embedded in the third-party webpage by the third-party host server to the second device or is a browser extension of the second web browser window.

20. The system of claim 1, wherein the providing of the video communication by the backend is by way of picture-in-picture within the first web browser window and the second web browser window, between the first device and the second device.

21. The system of claim 1, wherein the backend is further configured for playing a media file simultaneously on the first device and the second device when web screen sharing is being performed, the media file being selected based on an end customer of at least one or both of the two devices.

22. The system of claim 21, wherein the backend is configured for registering at least one website domain; wherein the front end is embedded in each of at least one web browser window of the first device, each web browser window associated with at least one of the website domains registered with the backend, each front end including a media player, wherein the backend is configured to generate a unique device identification (ID) for uniquely identifying the first device, wherein the backend is configured to direct the media player of only one web browser window of the at least one web browser window to play the media file.

23. The system of claim 22, wherein the only one web browser window to play the media file is an active web browser window.

24. The system of claim 1, wherein the front end within the first web browser application is embedded by the third-party host server in the third-party webpage or is a browser extension of the first web browser application.

25. The system of claim 1, wherein a second front end is provided within the second web browser application for the displaying of the third-party webpage on the second web browser window of the second device, wherein the second front end is embedded in the third-party webpage or embedded in a first party webpage generated by the backend or is a browser extension of the second web browser application.

26. The system of claim 1, wherein the third-party webpage of the first web browser window displays a good or service to be purchased, wherein the third-party webpage displayed on the second web browser window of the second device displays the good or service to be purchased.

\* \* \* \* \*